United States Patent [19] [11] 3,752,391
Leonard et al. [45] Aug. 14, 1973

[54] PUNCH AND PRINT DATA CARD RECORDER

[76] Inventors: George Hamlin Leonard; Raymond J. Enyeart, both of Varifab Inc. 1700 E. Putnam Ave., Greenwich, Conn.

[22] Filed: Sept. 13, 1971

[21] Appl. No.: 180,045

Related U.S. Application Data

[62] Division of Ser. No. 33,800, May 1, 1970, Pat. No. 3,682,093.

[52] U.S. Cl. ......................... 234/51, 83/115, 83/116
[51] Int. Cl. ............................................. G06k 1/02
[58] Field of Search ...................... 234/51, 115, 116, 234/101

[56] References Cited

UNITED STATES PATENTS

| | | | |
|---|---|---|---|
| 3,452,925 | 7/1969 | Gettle et al. | 234/115 X |
| 2,397,112 | 3/1946 | Hueber | 234/51 |
| 3,128,943 | 4/1964 | Stewart | 234/115 X |
| 3,388,858 | 6/1968 | Anderson | 234/115 X |
| 1,856,737 | 5/1932 | Thomas et al. | 234/116 X |

*Primary Examiner*—J. M. Meister
*Attorney*—St. Onge Mayers & Reens

[57] ABSTRACT

The disclosed data recorder includes a control cam operating to impart oscillating motions to separate punch and print actuators. The punch actuator reciprocates a punch bail to depress individual punches selected by data entry solenoids through punch interposers, thereby to perforate a data card. A step cam oscillated by the print actuator operates against print interposers coupled to the solenoids to angularly orient a print wheel, thus to imprint on the data card the data characters punched into the card. The data card is carried by a tray which is indexed through successive data entry positions in coordination with the control cam by tray stepping control apparatus. A replaceable ink cartridge supplies ink to the print wheel.

3 Claims, 40 Drawing Figures

Patented Aug. 14, 1973 3,752,391

18 Sheets-Sheet 1

Patented Aug. 14, 1973

3,752,391

18 Sheets-Sheet 16

PUNCH AND PRINT DATA CARD RECORDER

This is a division, of application Serial No. 33,800, filed May 1, 1970 now U.S. Pat. No. 3,682,093, granted Aug. 8, 1972.

BACKGROUND OF THE INVENTION

Data recorders of the type to which the present invention is directed have been typically of rather complex design and thus quite expensive. Moreover, they are typically of such size and weight as to be cumbersome to move about, and thus not particularly portable. Attempts to simplify the design and reduce the cost, as well as the size and weight, of such data recorders have typically resulted in the sacrifice in many desirable operating features which otherwise contribute to reorder flexibility, versatility and speed.

While the principle recording function of data recorders of the class presently concerned is to encode data cards by effecting discrete punched holes or perforations therein, it is extremely desirable to have the capability of also imprinting on the card the same data characters which are punched therein. This renders the card humanly readable as well as machine readable. In addition, it also serves as a convenient check on operator accuracy as well as a diagnostic aid to track down recorder malfunctions. Heretofore, recorders having both punching and printing capabilities have not been particularly reliable and are rather difficult to service due to their complex design. Moreover, the inclusion of both provisions in a single data recorder has unduly added to the recorders' size and weight. Thus, such dual capability recorders have not been particularly portable, and cannot be readily taken into the field where, in many instances, the data to be recorded originates.

Regardless of the data recorder design, the product it produces, i.e., the punched data card, must be accurately encoded since the data character perforations therein will be read at high speeds by a data card reader. The card perforations, must therefore, be properly formed and rather precisely positioned if they are to be correctly interpreted by the card reader. Thus, it is imperative that the data card to be accurately positioned in the recorder and precisely indexed therethrough so that the data character perforations are entered in proper storage locations or columns on the card. Even a small positional error, if cumulative, will result in interperative errors for data perforations toward the trailing end of the card.

It is accordingly a primary object of the present invention to provide an inexpensive punch card data recorder which is essentially portable, both in terms of size and weight.

A further object is to provide a data recorder of the above character which is simple in design, capable of high operating speeds, and includes a number of operating features which contribute to operational efficiency.

Still another object is to provide a data recorder of the above character which is capable of reliable and accurate operation, as well as long operating life and yet is of such simplified design as to be readily servicable in the field.

Yet another object is to provide a punch card data recorder of the above character which is adapted with a printer attachment for imparting interpretive printing to the punched card.

Other objects of the invention in will part be obvious and will in part appear hereinafter.

SUMMARY OF THE INVENTION

In accordance with the present invention, there is provided as essentially portable data recorder uniquely adapted to substantially simoultaneously punch successive data characters in a data card and to visibly imprint the same data characters on the card. The data card prepared by the subject data recorder is thus readily humanly readable as well as machine readable.

The subject data recorder includes a dual purpose control cam which is rotated through a complete revolution for each data entry cycle. This control cam is uniquely adapted to coordinate the punching and printing functions of the data recorder in an extremely simple and efficient manner. More specifically, the control cam operates to oscillate separate punch and print actuators; these actuators being moved from normal at rest positions to second positions at and back to their normal positions at the conclusion of each data entry cycle of the recorder.

The punch actuator is connected to reciprocate a punch bail as the former moves from its normal position to its second position and back. Selection solenoids individually energized from the recorder data entry keyboard are individually coupled to different data card punches by separate punch interposers. When a particular solenoid is energized, its plunger shifts the associated punch interposer to an actuated position where it is engaged by the punch bail as it is forced downwardly by the punch actuator. The actuated punch interposer in turn transmits the downward movement of the punch bail to the associated punch such that it is depressed to perforate a data card therebelow.

As the punch actuator begins its return movement from its second position to its normal position, it raises the punch bail which, in turn, lifts the selected punch out of perforating engagement with the data card. The actuated punch interposer is then released by the punch bail and it is returned to its normal position along with the actuated solenoid plunger by a spring.

While the punching function is being carried out, a print control cam is oscillated by the print actuator as it is moved from its normal position to its second position and back by the control cam. Print interposers coupled to the selection solenoid plungers are individually moved from normal to actuated positions with energization of their associated solenoids. The print cam engages the actuated print interposer to inhibit further movement of the print cam from a normal position toward a second limit position. The increment of movement of the print cam from its normal position to the point where it engages an actuated print interposer is dependent upon which selection solenoid was energized or, in other words, the data entry. The degree of movement of the print cam is uniquely amplified and coupled to a print wheel, which is proportionately rotated so as to be oriented with the appropriate data character in the proper print position relative to the data card. A print hammer, also controlled by the dual purpose control cam by way of the print actuator, causes the print wheel to impact against the data card to imprint the data character thereon.

As the print actuator is returned to its normal position by the control cam, the print cam and hammer are also returned to their normal positions and the print wheel rotates to a reference orientation preparatory to the next data entry cycle.

As an additional feature of the invention, a replaceable ink cartridge is removably inserted into the data recorder to position an ink impregnated inking roller in peripheral contacting engagement with an ink transfer roller which, in turn, peripherally engages the print wheel. As the print wheel is rotated in response to movement of the print cam during data character selection, fresh ink is applied to the type characters on the print wheel from the inking roller by way of the transfer roller.

The data card on which data is recorded by the recorder or the present invention is accommodated by a novel tray which is indexed past the data recording station for character punching and printing by novel tray stepping control apparatus. The card tray, among its other features, is uniquely adapted to accommodate data cards of varying lengths and is also adapted for convenient loading and unloading of data cards.

The card tray is urged to move in a card advance direction by a spring, however card advance is limited to discrete indexing steps by an escapement mechanism included in the tray stepping control apparatus. Each indexing step of the card tray by the tray stepping control apparatus, effected at the conclusion of each data entry cycle, advances the data card from one data entry position or column to the next. The tray stepping control apparatus is also uniquely adapted to perform tab operations. Thus, the card may be advanced from one data entry column to a subsequent data entry column without having to stop at each of the intermediate data entry columns. Tabs set and clear controls are provided for setting up tab stops for any selected data entry columns on the card.

After all of the desired data entries have been made on a particular data card, tray return apparatus is actuated to immediately return the tray and the data card thereon to a loading positon assessible to the operator where the completed data card is removed and a blank data card is positioned on the tray.

As will be seen from the detailed description to follow, the various operating functions of the data recorder of the present invention are performed efficiently and reliably with a minimum of operating parts. The various elements or parts are of an extremely simple design, resulting in low overall manufacturing costs. All of the various assemblies and sub-assemblies making up the data recorder are of compact design and capable of relatively high operating speeds, for example 15 data entries per second.

The disclosed printer apparatus of the present invention is uniquely designed as an attachment which can be quite readily adapted to data recorders having only key punch capabilities. The printer attachment in effect operates in parallel with the punch apparatus, and thus can be removed without effecting the operation of the data recorder as a strictly key punch recorder.

Aside from the initiation of a data entry cycle and other control functions from the keyboard of the data recorder, which are effected electrically, the operations are coordinated and carried out essentially mechanically, thus simplifying maintenance and servicing.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

FIG. 16 is a sectional view taken along line 16—16 of FIG. 2 showing the tray return subassembly;

DETAILED DESCRIPTION

Figure 1:
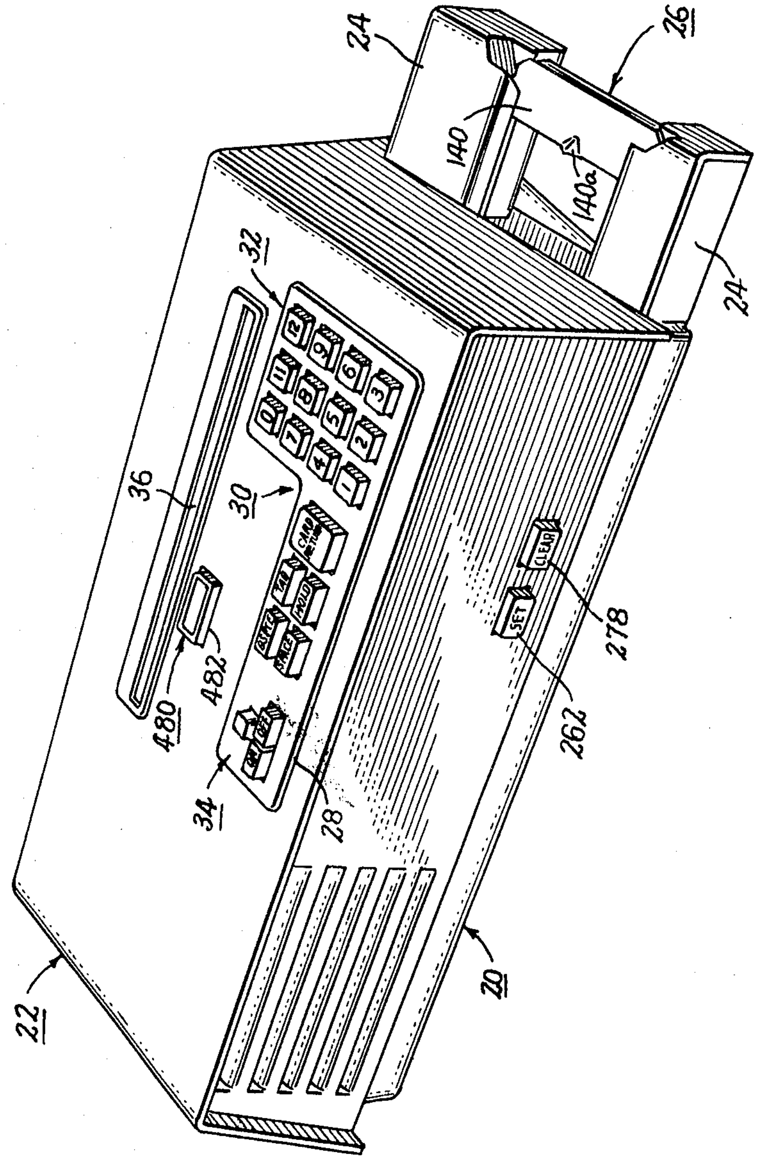
FIG. 1 is a perspective view of the external appearance of the data recorder of the present invention.

The portable data recorder of the present invention, seen generally in FIG. 1, includes a generally rectangular base 20 for mounting and supporting the various components of the recorder concealed under a removable cover 22. A pair of laterally spaced guides 24 extending from the right end of the base 20 serves to support and guide a tray, generally indicated at 26, which in turn accommodates a business card on which data is to be recorded. The card tray 26 is advanced to the left as seen in FIG. 1 in step increments as data is recorded in selected columns thereon.

The upper surface of cover 22 is apertured, as indicated at 28, to expose a keyboard, generally indicated at 30. The keyboard includes a cluster of data character entry keys, indicated at 32, and a cluster of function or control keys, indicated at 34. The top surface of the cover 22 is also formed having an elongated window 36 through which an indicator strip, to be described, is viewable to indicate the position of the card relative to a data recording station. That is, the operator, by looking into window 36, can determine which card column is aligned with the recording station. As will be seen, the card accommodated by card tray 26 is indexed or stepped to the left, column by column, with data characters entered in selected columns.

Figure 2:
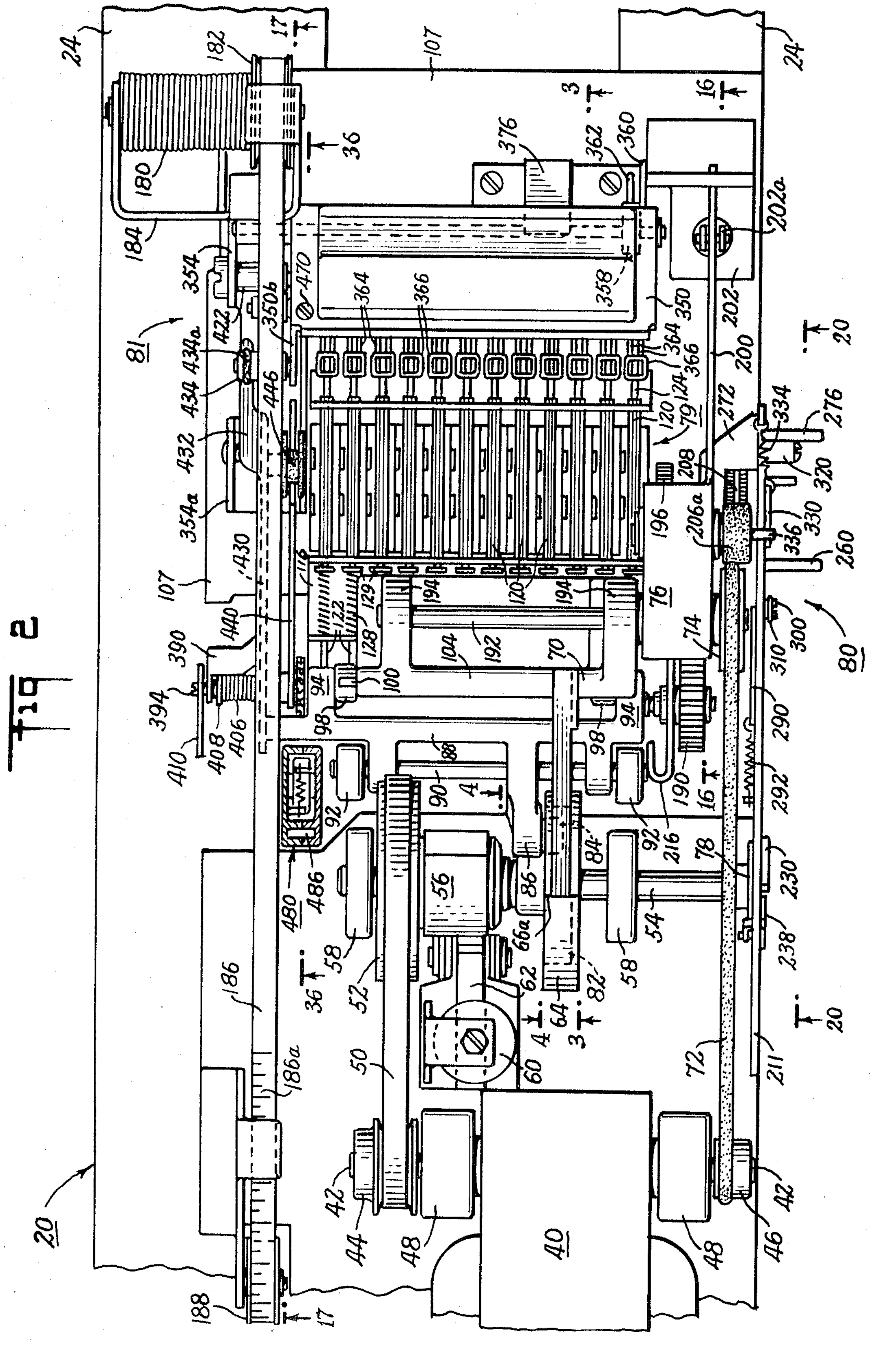
FIG. 2 is a plan view of the data recorder of FIG. 1 with the cover removed.

Turning now to FIG. 2, the main source of power for the data recorder of the present invention is derived from an electric motor 40 mounted on base 20. The motor output shaft 42 drives a pulley 44 secured to one end and another pulley 46 secured to its other end. A pair of trunnions 48, secured to base 20, journal the motor shaft 42 adjacent its ends. Pulley 44, by way of a belt 50, continuously drives a pulley 52 which is selectively coupled to a control shaft 54 through a one revolution clutch 56. Control shaft 54 is journalled in a pair of spaced trunnions 58.

The one revolution clutch 56 is engaged by actuation of a solenoid 60 whose plunger is linked thereto by a pivotally mounted bell crank 62. The solenoid 60 is energized incident to the depression of any one of the data entry keys 32 (FIG. 1) to engage clutch 56, thereby coupling pulley 52 to shaft 54 for one complete revolution. At the completion of a single revolution, the clutch 56 automatically disengages shaft 54 from pulley 52.

Figures 3, 4:
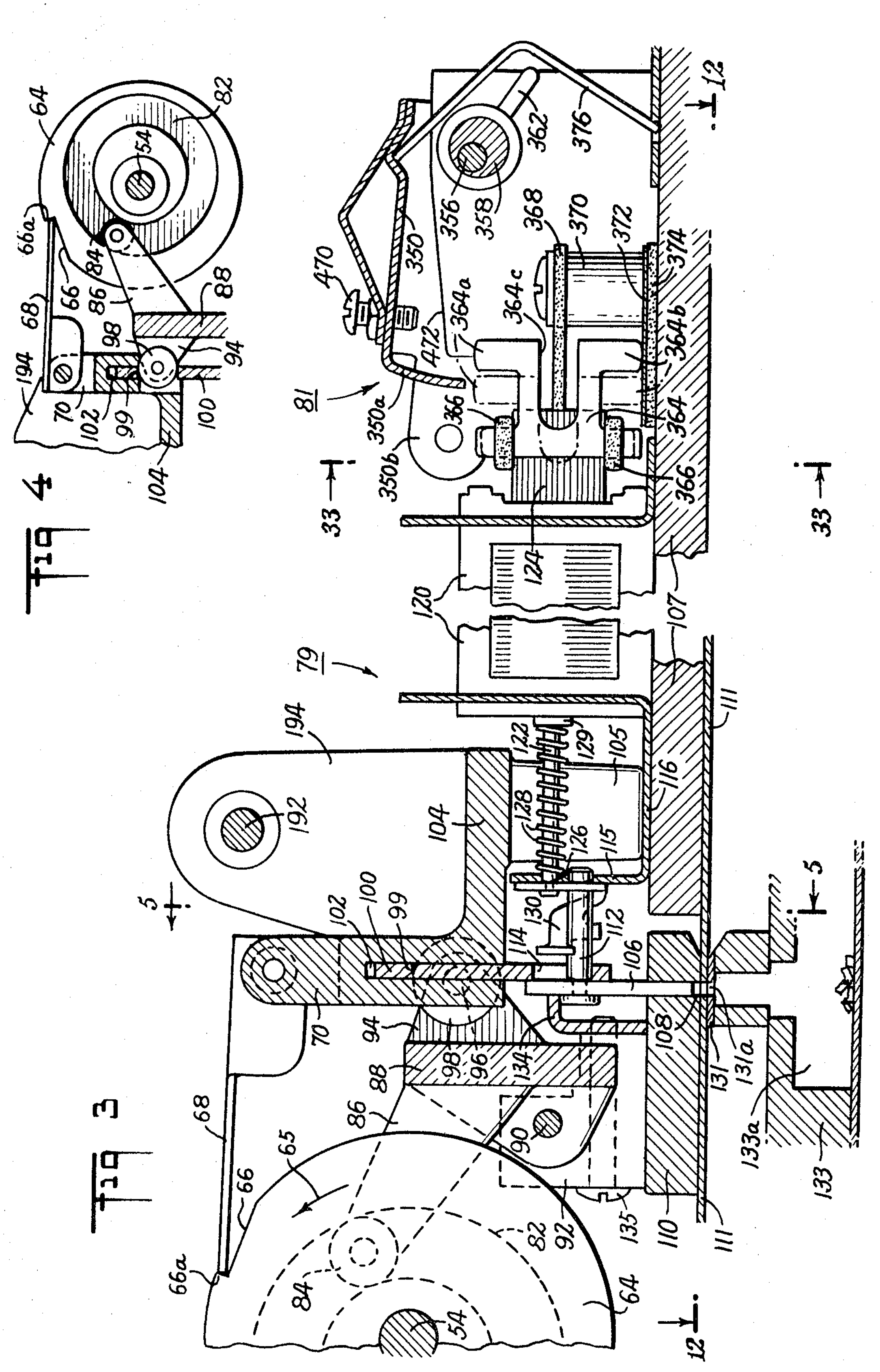
FIG. 3 is an enlarged sectional view taken along line 3—3 of FIG. 2 showing the punch apparatus of the present invention.
FIG. 4 is a sectional view showing the box cam coordinating the punch and print recorder operations, as taken along line 4—4 of FIG. 2.

As seen in FIGS. 2 through 4, a box cam 64 is mounted on drive shaft 54 and is rotated in the direction indicated by arrow 65. The peripheral surface of box cam 64 lies on a common radius except for a relief 66 formed therein. A resilient pawl 68, secured to a bracket 70, has its free end riding on the periphery of cam 64. As cam 64 begins one revolution, pawl 68 rides out of relief 66. At the conclusion of a revolution, pawl 68 falls back into the relief 66. A normal tendency of conventional one revolution/clutches is to tend to counter-rotate the driven shaft while it is disengaged. Thus, it is conventional practice to provide some sort of "anti-back" pawl such as pawl 68 to inhibit this counter-rotation. Thus, as best seen in FIG. 3, when the free end of pawl 68 falls into the relief 66 at the conclusion of each one revolution of control shaft 54, it engages the radial end wall 66a of relief 66 and thus resists any counter-rotation or clockwise rotation of the control shaft. Also, pawl 68 serves to establish a fixed home position for control shaft 54 in preparation for each data entry cycle calling for one control shaft revolution.

Returning to FIG. 2, pulley 46 secured to the other end of motor shaft 42 from pulley 44 drives a belt 72 which, in turn, engages a pulley 74 coupled to a tray return subassembly, generally indicated at 76. As will be described in conjunction with FIG. 16, the tray return subassembly 76 is actuated by an appropriate one of the control keys 34 to return the tray 26 and the card accommodated thereon to the right-most position (FIG. 1) or loading position, where an encoded card is removed and replaced with a blank card.

The lower end of the control shaft 54 mounts a cam 78 which is also rotated through a complete revolution to actuate a tray stepping control assembly, generally indicated at 80 and described in detail in connection with FIGS. 20–32. Among other things, the tray stepping control assembly 80 operates normally to index the tray such that the card is stepped in relation to the fixed recording station from data position or column to the next. The data recording stations consists of two data entry mechanisms, punch apparatus generally indicated at 79 and a printer attachment generally indicated at 81 (FIG. 2).

PUNCH APPARATUS

Returning to FIGS. 2 through 4, box cam 64, rotating with drive shaft 54, has a recessed annular cam track 82 formed in a face thereof. This cam track accommodates a cam follower roller 84 rotatably mounted by a cam follower arm 86 carried by an actuator 88. Actuator 88 is pivotally mounted on an actuator shaft 90 carried by fixed mounting posts 92. The geometry of cam track 82 of cam 64 is such as to produce a rocking motion of the actuator 88 about its shaft 90. More specifically, as the positive motion can 64 begins its one revolution during a recording cycle, cam follower arm 86 is forced upwardly by the inner cam track wall as the mean track radius increases to rock the actuator 88 in the clockwise direction (counterclockwise in FIG. 4). As the cam 64 returns to its home position concluding its one revolution, arm 68 is forced downwardly by the outer cam track wall as the mean track radius decreases to rock the actuator in the opposite direction, returning it to the orientation shown in FIGS. 3 and 4.

Figure 5:
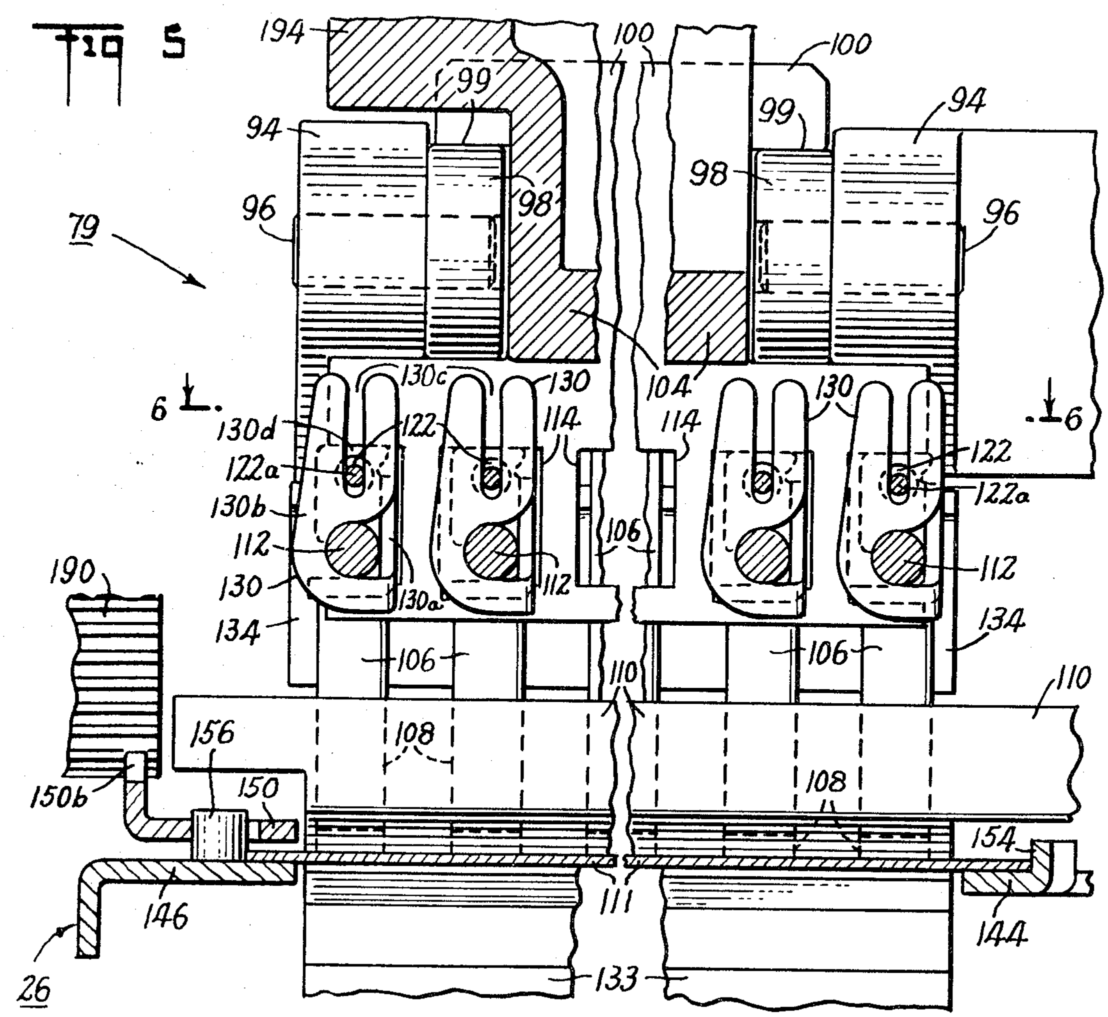
FIG. 5 is a sectional view taken along line 5—5 of FIG. 3.
Figure 9:
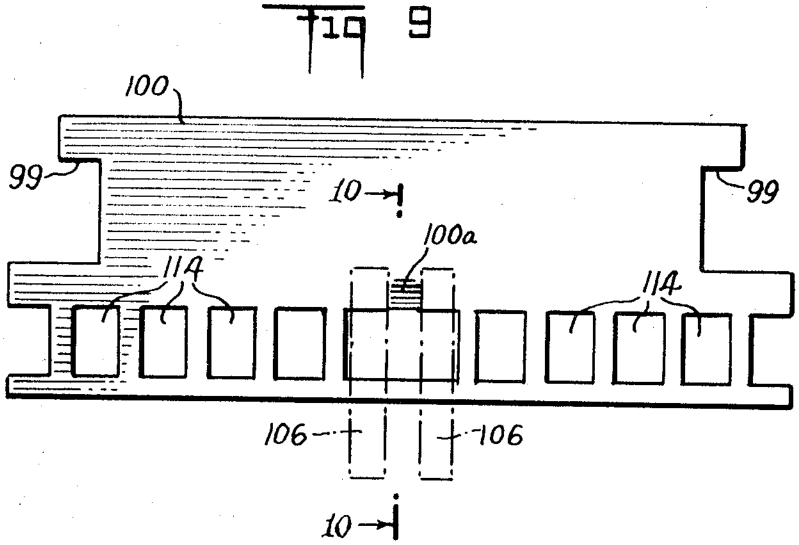
FIG. 9 is a side elevational view of the punch bail incorporated in the punch apparatus of FIG. 3.

The actuator 88, which spans substantially the entire width of the recorder as seen in the plan view of FIG. 2, is integrally formed with a punch actuator arm 94 adjacent each end. Each of these arms, as best seen in FIG. 5, carries a shaft 96 for rotatably mounting a roller 98. The rollers 98 are received in notches 99 formed in the upper side edges of a punch bail 100 (FIG. 9). Punch bail 100, as seen in FIGS. 3 and 7, is received in a downward opening, laterally extending channel 102 formed in a bail guide block 104 supported by feet 105 secured to a fixed top plate 107.

From the description thus far, it is seen that as the actuator 88 is rocked by box cam 64, the rollers 98 operating in notches 99 cause the punch bail 100 to reciprocate first downward and thenupward in channel 102. Specifically, during the first half of a recording or data entry cycle, the actuator 88 is rocked in the clockwise direction and the rollers 98 acting against the lower edges of notches 99 force the bail 100 downwardly substantially to the position shown in FIG. 7. During the second half of a recording cycle when the actuator is rocked in the opposite direction, the rollers 98 act against the upper edges of notches 99 to force the bail 100 upwardly, returning it to its normal upper position shown in FIG. 3.

Figure 7:
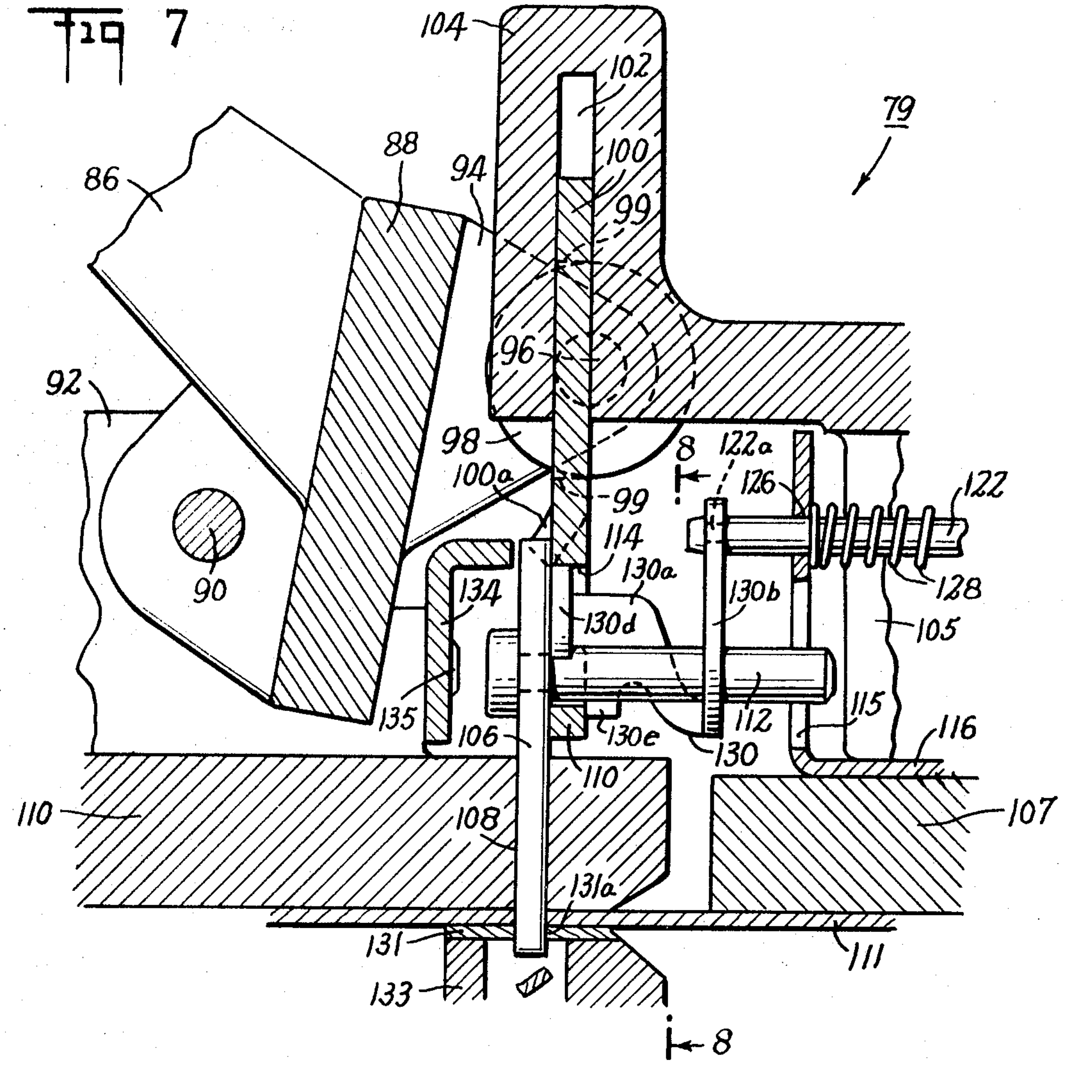
FIG. 7 is an enlargement of a portion of the sectional view of FIG. 3 showing various parts of the punch apparatus in their card perforating positions.

Referring to FIGS. 3, 5, 7, 8 and 11, a laterally extending row or bank of vertically oriented punches 106 have their lower end portions slidably received in mating holes 108 formed in a punch block 110 fixedly positioned above the path of travel of a data card 111. The individual punches 106 are aligned across the width of the recorder and thus defined the punch data recording station of the recorder. Each punch 106 mounts an interposer guide pin 112 which extends horizontally through a separate window 114 formed in the lower portion of the punch bail 100 which extends below and just to the right of the upper ends of each punch. The right ends of interposer guide pins 112, as best seen in FIGS. 3 and 7, are received in separate vertically elongated slots 115 in an upright left portion of a U-shaped bracket 116 secured by suitable means to top plate 107.

Referring specifically to FIG. 3, the upstanding right end portion of bracket 116 is adapted to support and individually locate a bank of solenoids 120, seen also in FIG. 2. Each solenoid 120 operates an interposer actuator pin 122 whose right end is slidably received into the solenoid plunger cavity where it abuts the left end of a solenoid plunger 124. The other end of each actuator pin 122 is slidably received an aligned hole 126 formed in the left upstanding end of bracket 116. A spring 128 acting against bracket 116 and a stop 129 secured to each actuator pin normally biases its associated actuator pin to the right as seen in FIG. 3.

The left end of each actuator pin 122 beyond the left upright end of bracket 116 engages a punch interposer 130 slidably carried by each interposer guide pin 112.

Figure 6:
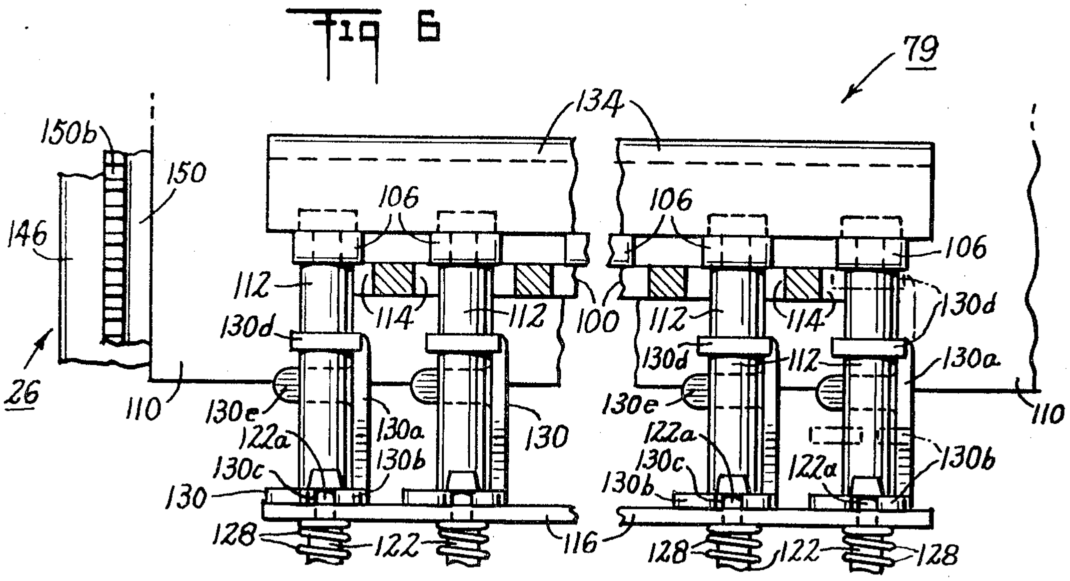
FIG. 6 is a sectional view taken along 6—6 of FIG. 5.
Figure 11:
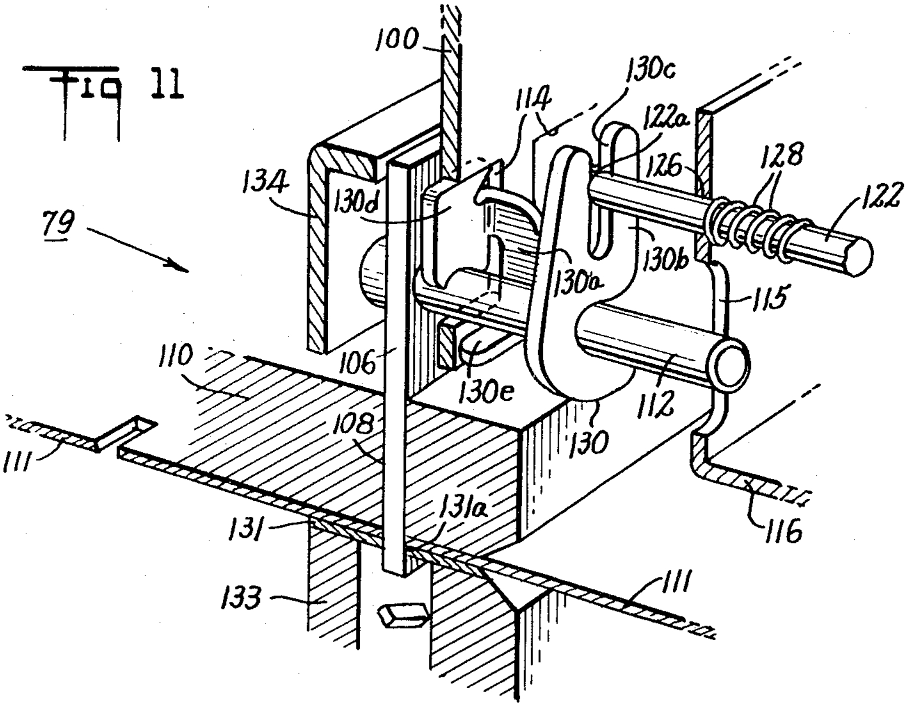
FIG. 11 is a perspective view of the portion of the punch apparatus shown in FIG. 7.

As best seen in FIGS. 7 and 9, the interposers 130, which ideally can be formed from sheet metal stampings, have a body portion **130*a* carrying an integral upright end portion 130*b*. Upright end portion 130b of each punch interposer 130, as best seen in FIGS. 6 and 11, is formed having a vertically elongated slot 130*c* which is received in an annular notch 122*a* formed in its associated actuator pin 122. Punch interposer body 130*a* is intervally formed at its other end with a laterally extending tab 130d which extends over the top of its associated interposer guide pin 112 while an intermediate integral tab 130*e* extends beneath the associated interposer guide pin. The punch interposers 130 thus effectively embrace their associated interpose guide pins 112** such that they are slidably mounted thereon.

In operation, when one of the solenoids 120 is actuated, its plunger 124 pushes the associated actuator pin 122 to the left as seen in FIG. 3. Since the associated punch interposer 130 is engaged in the annular notch **122*a* formed in the actuator pin, it is also forced to the left. The interposer 130, sliding on its associated interposer guide pin 112, in moving to the left, positions its tab 130*d* within the aligned window 114 of punch bail 100. It is seen that as the punch bail 100 reciprocates downward, tab 130*d* of the actuated interposer 130 is wedged between the upper edge of window 114 and the body of its associated interposer guide pin 112. As a result, the particular punch 106 connected to that guide pin 112 is forced downwardly by the punch bail, ultimately to create a perforation in the card 111 positioned therebelow. As seen in FIGS. 3 and 7, a punch die plate 131 supported immediately beneath card 111 is formed with apertures 131a through which the lower ends of the punches 106 extend in effecting card perforations. A cavity 133a formed in the die plate support structure 133 serves to accumulate the resulting chad. It is seen that the elongated slots 130*c* in the interposers 130 and the slots 115 to the left upright end of bracket 116 accommodate downward movement of the interposers and the guide pins 112 with the selected punches 106**.

As the punch bail 100 under the control of box cam 64 reaches the lower limit of its downward card perforating movement and starts back upwardly, the bottom edges of the windows 114 in the punch bail 100 engage the depressed interposer guide pins 112, lifting them and the punches 106 connected thereto. Normally, a single perforation in a card column enters a complete data character, and thus only one punch 106 is depressed during each data entry cycle.

Since the interposers 130 are loosely fitted on the interposer guide pins, the interposer tab **130*d* is no longer wedged between the body of an interposer guide pin and the upper edge of a window 114 as punch bail 100 begins moving upwardly. An interposer 130 is thus free to return to the left with its associated actuating pin 122 under the force of spring 128 just as soon as bail 100 begins to lift a depressed interposer guide pin 112 and punch 106 upwardly. An elongated upper limit punch stop 134 secured to mounting block 92 by bolts 135 is formed having a laterally extending upper portion overlying the heads of all of the interposer guide pins 112 so as to define the upper limit position for the entire bank of punches 106**.

Figure 8:
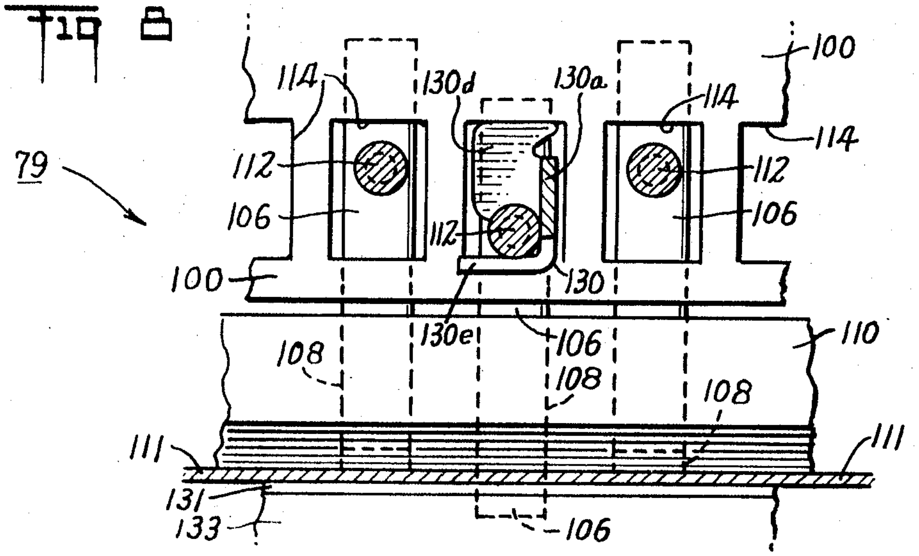
FIG. 8 is a sectional view taken along 8—8 of FIG. 7.

It is seen from FIG. 8 that those punches whose associated punch interposers have not been shifted to actuated positions by the solenoids 120 are not depressed since the clearance between the upper edges of the bail windows 114 and the interposer guide pins 112 at their upper limit positions is sufficient such that the bail 100 does not engage the guide pins as it reciprocates downward. Thus, the presence of an actuated punch interposer is required to transmit the downward movement of the punch bail to any of the punches 106.

Figure 10:
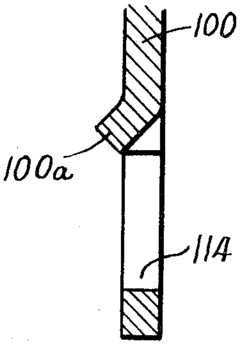
FIG. 10 is a fragmentary sectional view taken along line 10—10 of FIG. 9.

Referring to FIGS. 7, 9 and 10, the partition between the middle two windows 114 of punch bail 100 is removed in order that a locating tab **100*a* may be struck therefrom. Tab 100*a* is positioned such as to extend between the middle two punches 106 which are rather precisely located by punch block 110. Thus tab 100*a* serves to precisely laterally locate the punch bail 100 relative to the punch bank and also to laterally constrain the punch bail within the chamber 102 in bail guide 104**.

CARD TRAY

Figure 12:
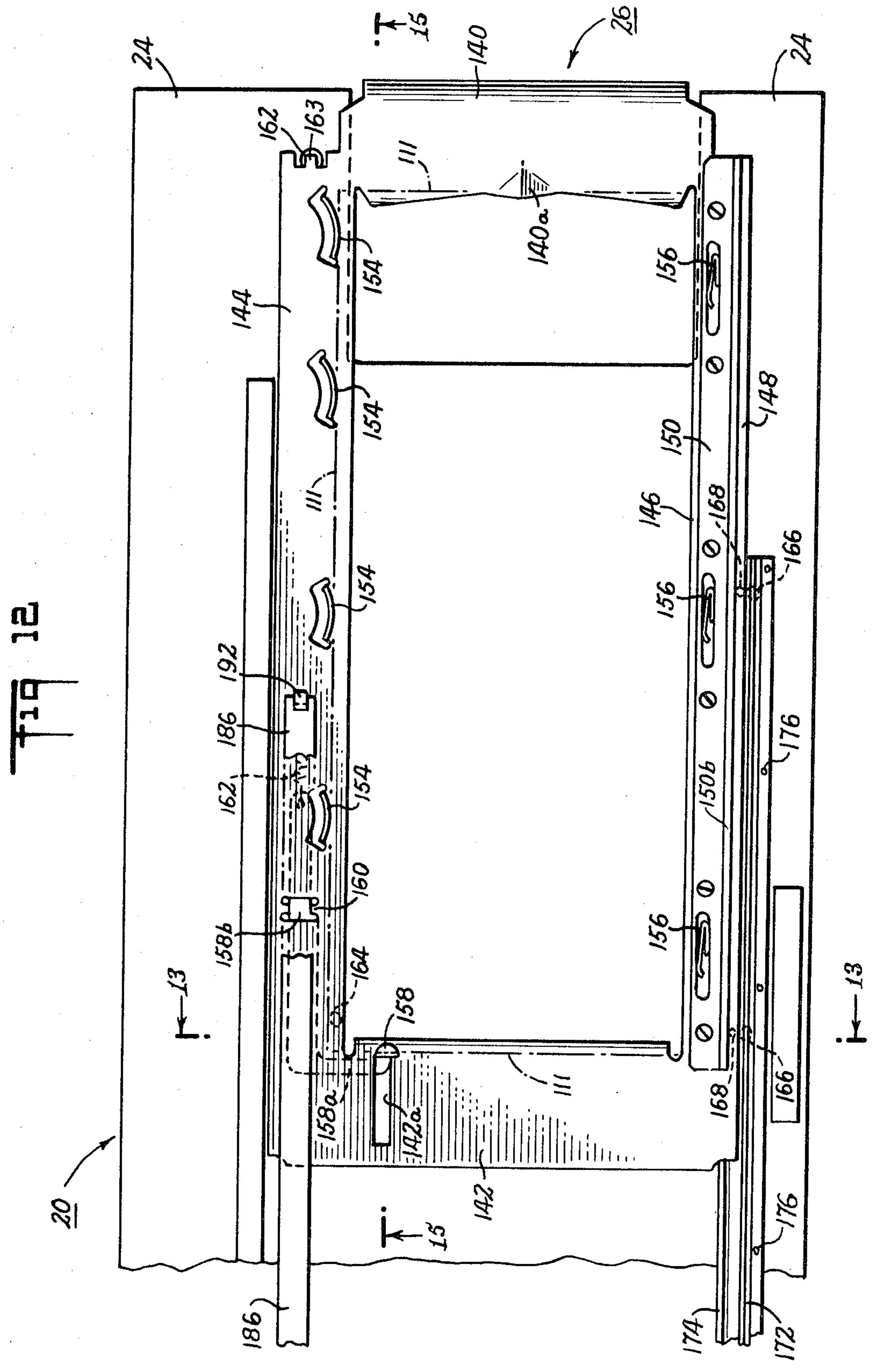
FIG. 12 is a sectional view taken along line 12—12 of FIG. 3 showing the card tray in plan view.
Figure 13:
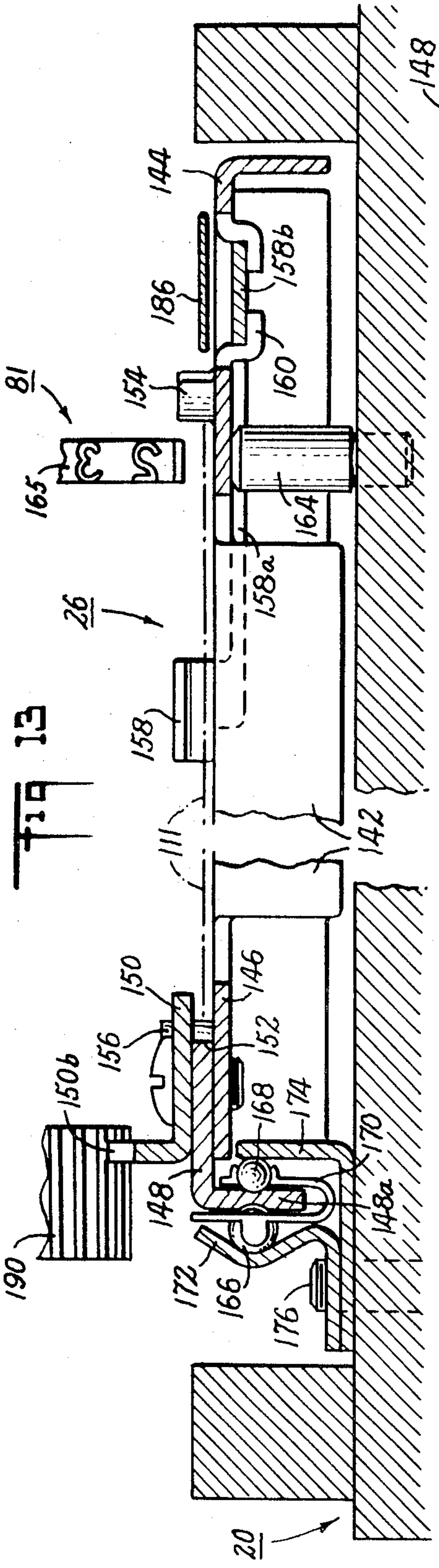
FIG. 13 is a sectional view taken along line 13—13 of FIG. 12.

Turning now to FIG. 12, the card tray 26 includes a front panel 140 and a back panel 142 interconnected by side rails 144 and 146, seen also in FIG. 13. The central portion of tray 26 is open to accommodate the card perforating movements of the punches 106.

As seen in FIGS. 12 and 13, a pair of elongated L-shaped members 148 and 150 are secured to side rail 146 of the tray 26 and extend along the entire length thereof. The right edge of L-shaped member 150 overlaps the right edge of member 148 so as to form an elongated channel 152 for accommodating one long edge of the card 111. The other long edge of the card abuts a series of upright tabs 154 (FIG. 12) struck from side rail 144. Also as best seen in FIG. 12, a series of springs 156 stationed in channel 152 bear against the edge of the card accommodated therein to urge the card toward side rail 144 with its other long edge against tabs 154.

Figures 14, 15:
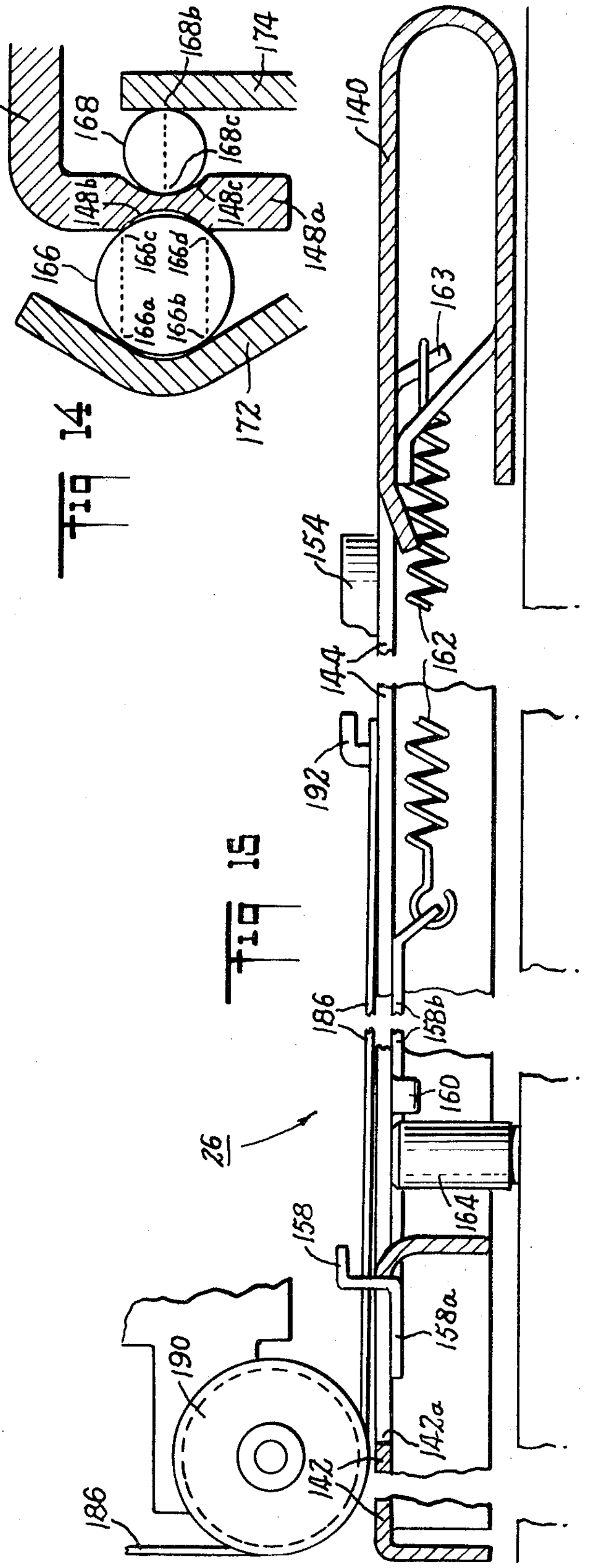
FIG. 14 is an enlargement of a portion of the sectional view of FIG. 13.
FIG. 15 is a sectional view taken along line 15—15 of FIG. 12.

The leading edge of the card 111 as positioned on tray 26 engages a resilient abutment 158 seen in FIGS. 12, 13 and 15. Abutment 158 as seen in the plan view of FIG. 12, is generally L-shaped, having an elongated leg **158*a* mounted for reciprocating movement by tabs 160 (FIG. 13) struck from side rail 144. The free end of leg 158*a* is connected by a spring 162 to a tab 163 struck from slide rail 144 (FIG. 15). The other shorter leg 158*b* of abutment 158 extends along back panel 142 and is bent upwardly to extend through an elongated slot 142*a* formed therein. The end of leg 158*b* extending above back panel 142 is bent forwardly to overly the leading edge of the card 111**.

It is seen that as the card is positioned on the tray 26, the abutment 158 is forced to the left as seen in FIGS. 12 and 15 against the force of spring 162. The trailing edge of the card is then engaged under an upwardly formed lip **140*a* in the left edge of front panel 140 as seen in FIG. 12. The abutment 158 urges the card to the right toward front panel 140 to insure that the trailing edge of the card remains caught under lip 140*a*. The card is thus removably positioned on tray 26** for the receipt of data and the tray readily accommodates cards of varying lengths.

As best seen in FIG. 13, the right side of tray 26 is supported on an upright post 164 mounted by base 20; the upper end of post 164 bearing against the undersurface of side rail 144. This post is positioned adjacent the recording station of the recorder and thus is laterally aligned with the bank of punches 106. As will be seen, the post 164 supports the tray 26 at a point immediately below a printing wheel 165 included in the printer attachment 81 (FIG. 2).

The mounting for the other side of tray 26 is effected by two pairs of ball bearings, one pair being visible in the sectional view of FIG. 13. Specifically, leg **148*a* of L-shaped member 148, extending downwardly beyond the outer edge of slide rail 146, is formed having opposed elongated grooves 148*b* and 148*c* which serve as one side of separate races for ball bearings 166 and 168. It is understood that there are two pairs of ball bearings 166 and 168, each pair being held in a U-shaped retainer clip 170. The other side of the race for ball bearings 166 is formed by an upright arcuate member 172 while the other side of the race for ball bearing 168 is formed by an upright member 174. Race members 172 and 174 have horizontal extensions by which they are secured to the base 20 by bolts 176**.

As best seen in FIG. 14, the geometry of the arcuate race surface of member 172 and of the groove **148*b* in member 148 is such that the large ball bearings 166 are in essentially four point contact with its race. Specifically, each ball bearing 166 contacts the surface of race member 172 at two points 166*a* and 166*b* and also contacts the surface of groove 148*b* at two points 166*c* and 166*d*. Ball bearing 168, on the other hand, has essentially a single point contact 168*a* with the surface of groove 148*c* and a single point contact 168*b* with the left surface of race member 174**.

By virtue of this tray mounting, the right side of the tray 26 as seen in FIG. 13 may swing upwardly to a limited extent without binding the ball bearing pair, and thus impeding the slidability of the tray. Moreover, since the tray 26 is preferably made of rather relatively thin sheet metal, the disclosed ball bearing mounting resists binding despite limited flexural distortions of the tray. Specifically, as the right side of tray 26 lifts up or the tray is otherwise twisted from its preferred planar configuration, the locations of these point contacts appropriately shift so as to retain the requisite ease of longitudinal slidability for the tray. Otherwise the tray is securely laterally constrained.

During advancement of the tray 62 into the data recorder and return of the tray for card loading and unloading, the ball bearing pairs roll in their respective races one half the distance the tray moves. I have found that two pairs of ball bearings are sufficient to slidably mount and guide the tray for longitudinal movement into and out of the data recorder.

Figure 17:
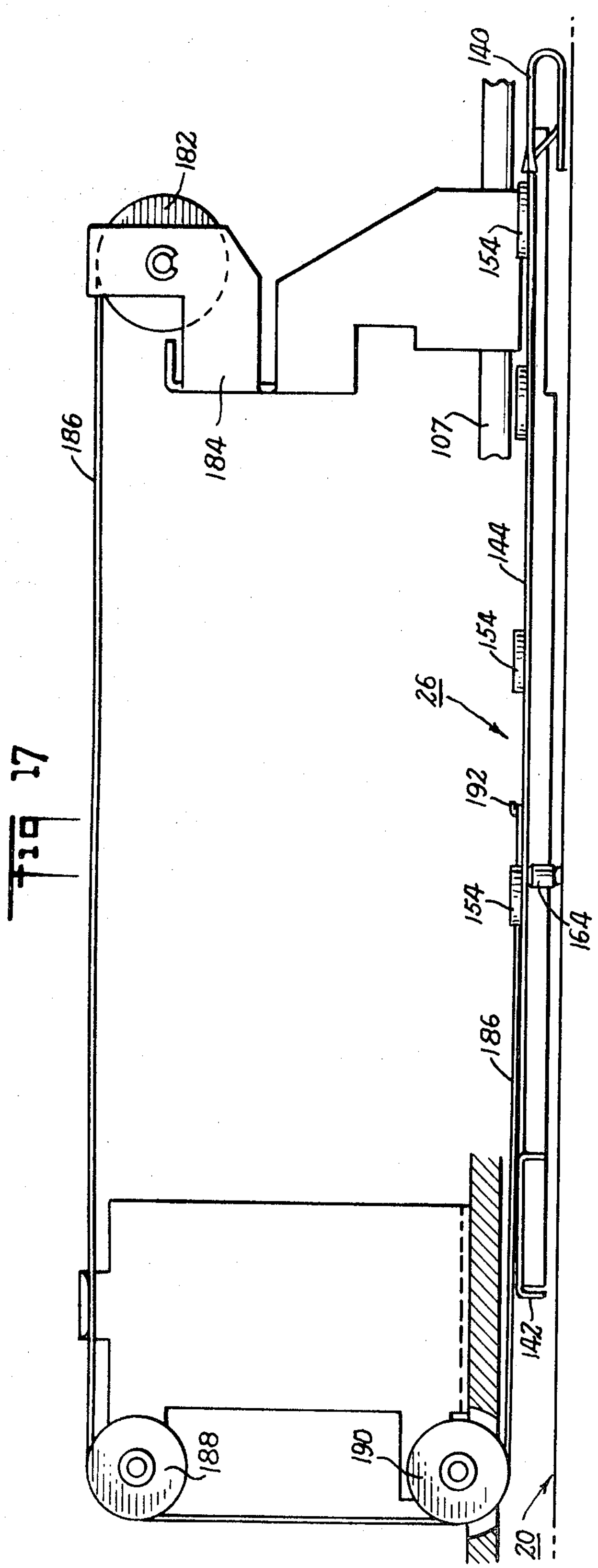
FIG. 17 is a sectional view taken along line 17—17 of FIG. 2 to show a portion of the power train for advancing the card tray.

To advance the tray 26 into the recorder for the purpose of making data entries in the card 111 thereon, a torsion spring 180 acts on a takeup reel 182 journalled by a bracket 184 (FIG. 2), tending to rotate the reel in the clockwise direction as seen in FIG. 17. A band 186 anchored at one end to reel 182 is tracked around recorder frame mounted pulleys 188 and 190, seen in FIG. 17. The other end of band 186 is engaged by a hook 192 struck from tray side rail 144 (also FIG. 15). Spring 180 acts on reel 182 tending to rotate it in the clockwise direction so as to take up or wind up the band 186. In so doing, tray 26 is urged to the left as seen in FIG. 1, i.e., into the data recorder. This movement in the card advance direction is controlled by the tray stepping control means 80 (FIG. 2) to be described.

As seen in FIG. 2, the band 186 carries on its upper surface a suitable card column scale 186a which is viewable through the window 36 of the housing 22 seen in FIG. 1. The placement of this indicia 186a on band 186 is coordinated with the position of the card on tray 26 such that it will indicate which data entry position or column of the card is aligned at the data recording station, or more specifically, the bank of punches 106 and print wheel 165.

Figure 18:
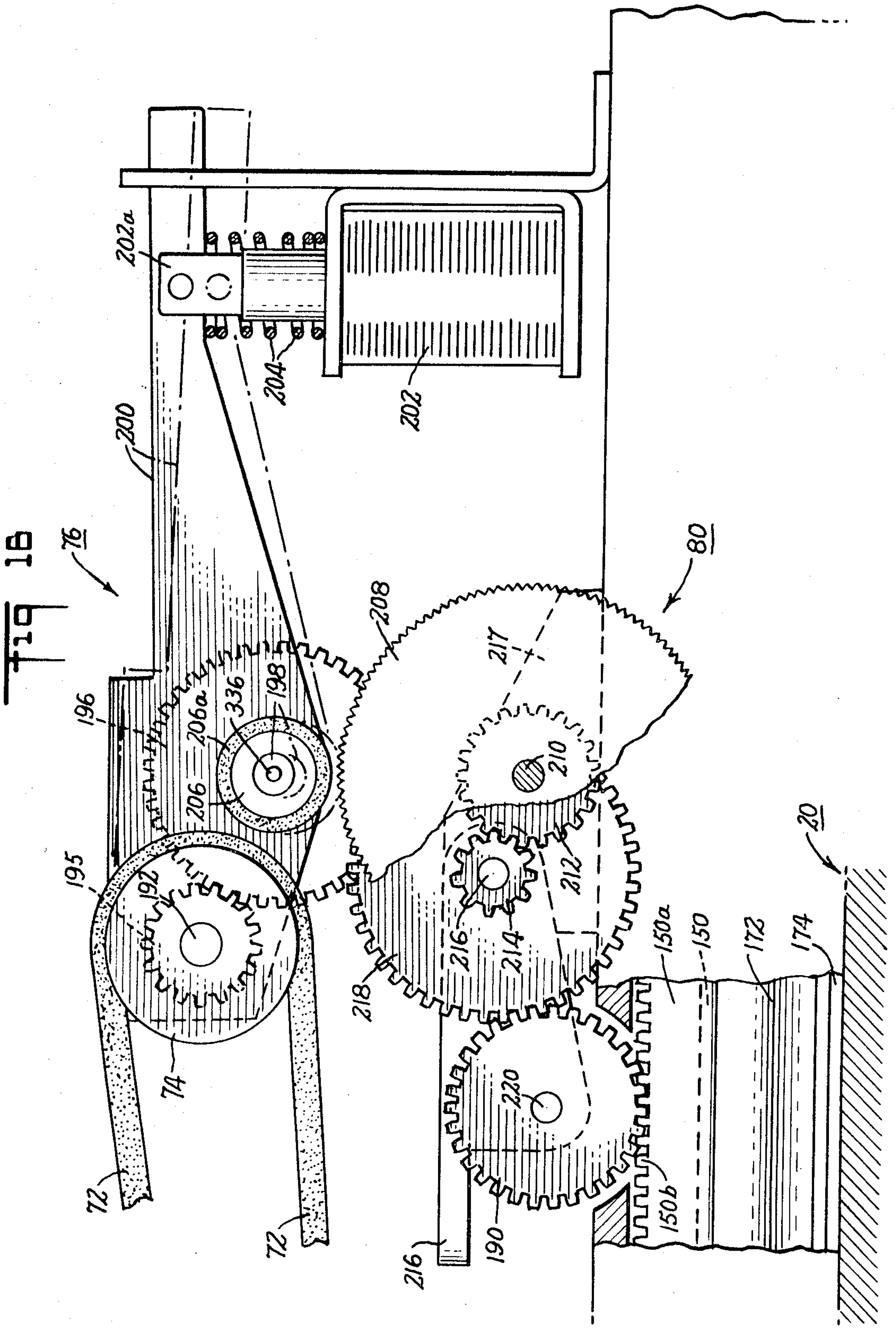
FIG. 18 is a fragmentray plan view of the recorder of FIG. 1 illustrating modified means for indicating the position of the data card relative to the recorder recording station.
Figure 19:
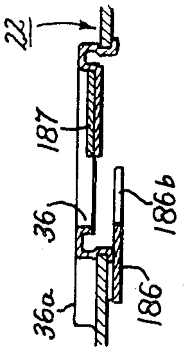
FIG. 19 is a sectional view taken along line 19—19 of FIG. 18.
Figure 18:
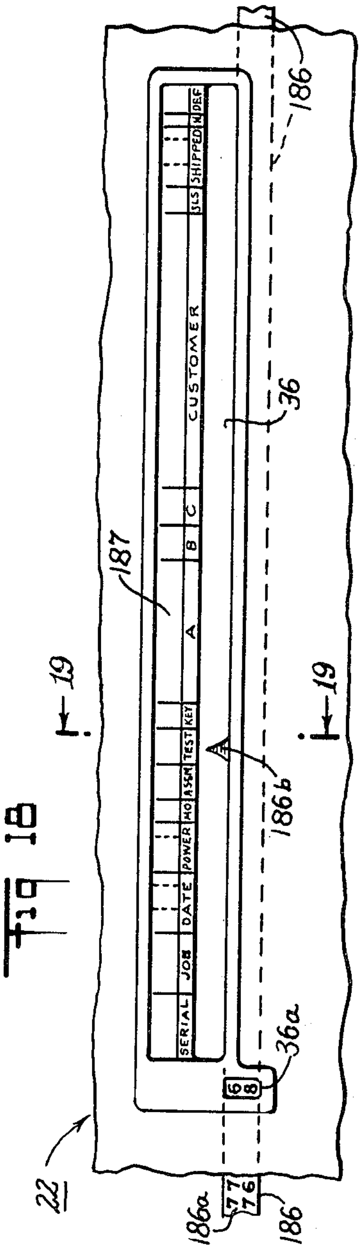

FIGS. 18 and 19 illustrate a modified card column indicator arrangement wherein the band 186 also carries a pointer 186b which indicates on an illustrative card column heading strip 187 accommodated in window 36 the type of data to be entered in the columns arriving at the data recording station. The band 186 would preferably still carry indicia 186a viewable through a small window 36a to identify the number of the card column aligned with the recording station.

Returning to FIG. 13, L-shaped member 150 has an elongated upper extending leg 150a whose upper edge is toothed to form an elongated rack gear 150b extending the entire length of tray 26. Rack gear 150b is engaged by a pinion gear 190 included as part of the tray return subassembly 76 (FIG. 2).

TRAY RETURN SUBASSEMBLY

The tray return subassembly 76, seen generally in FIG. 2, is shown in detail in FIG. 16. Pulley 74 driven from pulley 46 via belt 72 (FIG. 2) is secured on a carriage return shaft 192 journalled in upright brackets 194 intervally formed with punch bail guide 104. A gear 195 secured to pulley 74 for rotation on tray return shaft 192 engages a larger gear 196 journalled on a stub shaft 198 carried by a tray turn actuator lever 200. Actuator lever 200 is mounted by the tray return shaft 192 for pivotal movement thereabout in response to energization of a solenoid 202 whose plunger 202a is connected to the actuator free end. A spring 204 normally urges the tray return actuator lever 200 upwardly in the counterclockwise direction.

A roller 206, fitted with a rubber tread 206a is secured to the gear 196 for rotation therewith about stub shaft 198. When the actuator lever 200 is pivoted in the clockwise direction by actuation of solenoid 202, roller 206 bears against the knurled periphery of a pinwheel 208 which is part of the tray stepping control assembly 80 (FIG. 2) to be described. While roller 206 bears against the periphery of pin wheel 208, gear 196 remains in meshing engagement with gear 195, and thus the pin wheel is rotated on a stub shaft 210 carried by an upright mounting plate 211. A gear 212, preferably integrally formed with pin wheel 208, engages a gear 214 journalled on a stub shaft 216 carried by a fixed bracket 217. Gear 214 is secured to a larger gear 218 also carried by stub shaft 216. Gear 218, in turn, engages gear 190 journalled on a stub shaft 220 carried by bracket 216. It will be recalled that gear 190 is in meshing engagement with the tray rack gear 150b.

It is thus seen that when solenoid 202 is energized from the keyboard, such as in response to depression of a card or tray return key or a backspace key in key cluster 34, tray return actuator lever 200 is pivoted clockwise causing the roller 206 to bear against and drive the pin wheel 208. Through the interconnecting gear cluster, the tray 26 is driven in the return direction, or to the right as seen in FIG. 1. When solenoid 202 is de-energized, the spring 204 pivots the actuator 200 in the counterclockwise direction, removing the roller 206 from the periphery of pin wheel 208. Tray return movement is thus discontinued. When it is desired to return the tray to its rightmost or card loading position, the card return key is momentarily depressed to establish a holding circuit sustaining energization of solenoid 202, which circuit is broken when the tray 26 returns to the loading position. When a backspace function is called for, the backspace key is depressed to effect coupling of the drive of pulley 74 to gear 190. The tray 26 is moved in the tray return direction by a distance corresponding to the duration of depression of the backspace key.

TRAY STEPPING CONTROL ASSEMBLY

Figure 20:
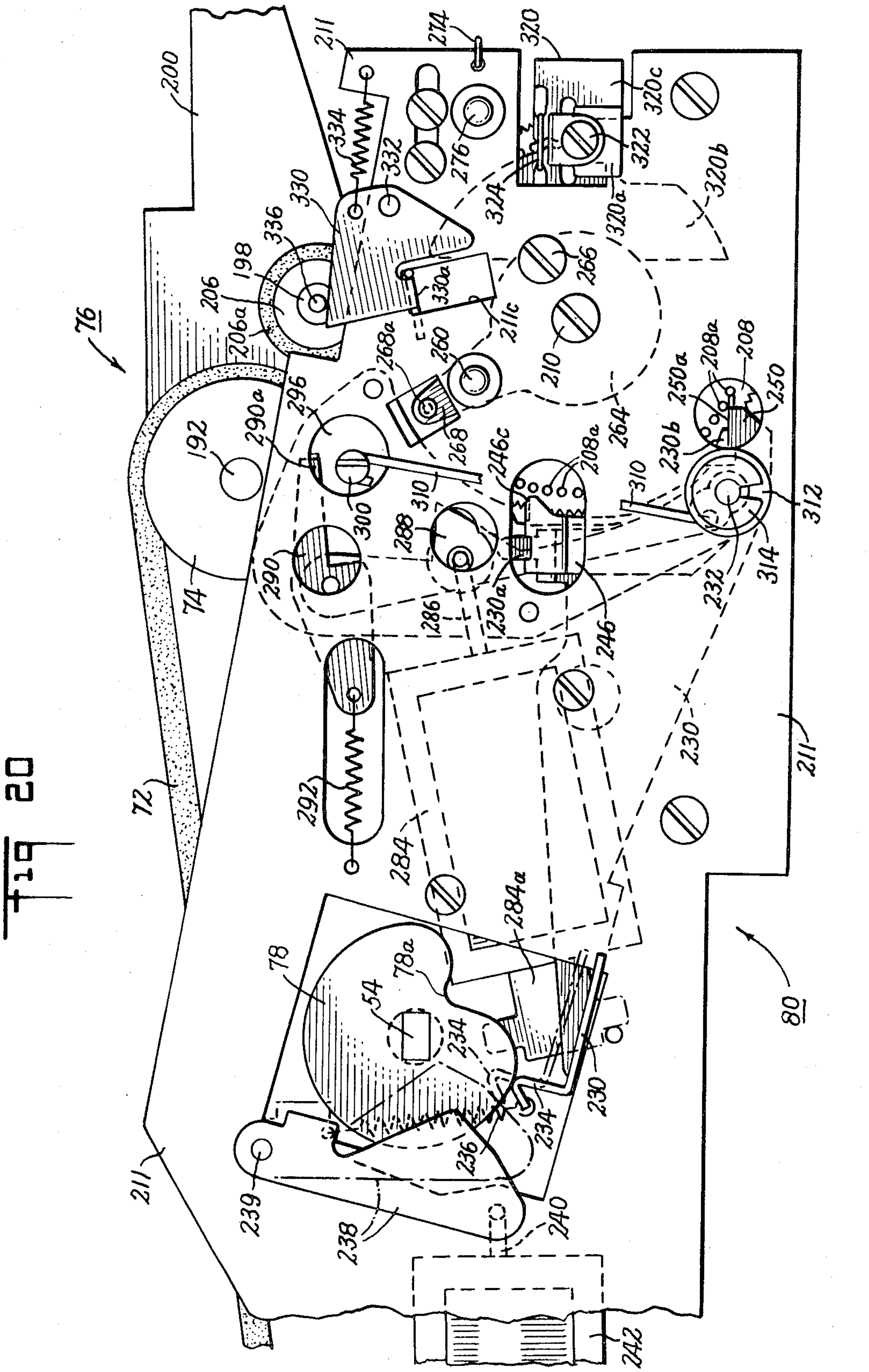
FIG. 20 is a sectional view of the tray stepping control assembly as taken along line 20—20 of FIG. 2.

The tray stepping control assembly 80, seen in FIGS. 20 through 32, includes a trip lever 230 which is pivotally mounted adjacent its lower right end on a pivot post 232 carried by upright mounting plate 211, as best seen in FIG. 20. The left end of trip lever 230 carries a cam follower 234 which is urged against the periphery of trip cam 78 keyed on control shaft 54 by a spring 236 anchored at its other end to a hold lever 238 mounted on a pivot pin 239 carried also by mounting plate 211. The lower end of hold lever 238 is engaged by the hooked end of a hold actuating pin 240 operatively engaged by the plunger of a hold solenoid 24?. When cam follower 234 bears against the periphery of trip cam 78, spring 236 serves to pivot the hold lever 238 clockwise, holding it in an inoperative position. When solenoid 242 is energized, the actuating pin 240 is pushed to the right by the solenoid plunger, pivoting the hold lever 238 counterclockwise to an operative position shown in phantom where its lower edge engages the crooked end of cam follower 234, thereby preventing the cam follower from riding into the valley 78a in the trip cam periphery.

As will be seen, this inhibits the normal rocking movement of trip lever 230 about its pivot post 232 in response to a complete rotation of cam 78, thereby preventing indexing advancement of the card tray 26 under the force of torsion spring 180 acting through the power train consisting of tray rack gear 150b and the interconnecting gear cluster between it and pin wheel 208 (FIG. 16). This hold function is initiated in certain situations when it is desired to effect more than one data character perforation in a single card data column, as is required, for example, to represent alphanumeric characters. Thus, if a hold key in the keyboard is depressed to energize solenoid 242, and then a data character key is depressed to initiate a data character entry cycle, the cam 78 goes through a complete revolution as the data character is punched into the card. However, since the hold lever 238 has engaged the cam follower 234, the trip lever 230 is not actuated and the card tray is not indexed to advance the data card and align the next data column with the bank of punches 106. Then if the hold solenoid 242 is released, and a second data character key is depressed, a second perforation will be made in the same data column. The cam follower 234 in this case is permitted to follow the contour of trip cam 78 and when it rides into the valley 178a at the conclusion of a data character entry cycle, the trip lever 230 is actuated to index the data card to the next data column position.

Figure 21:
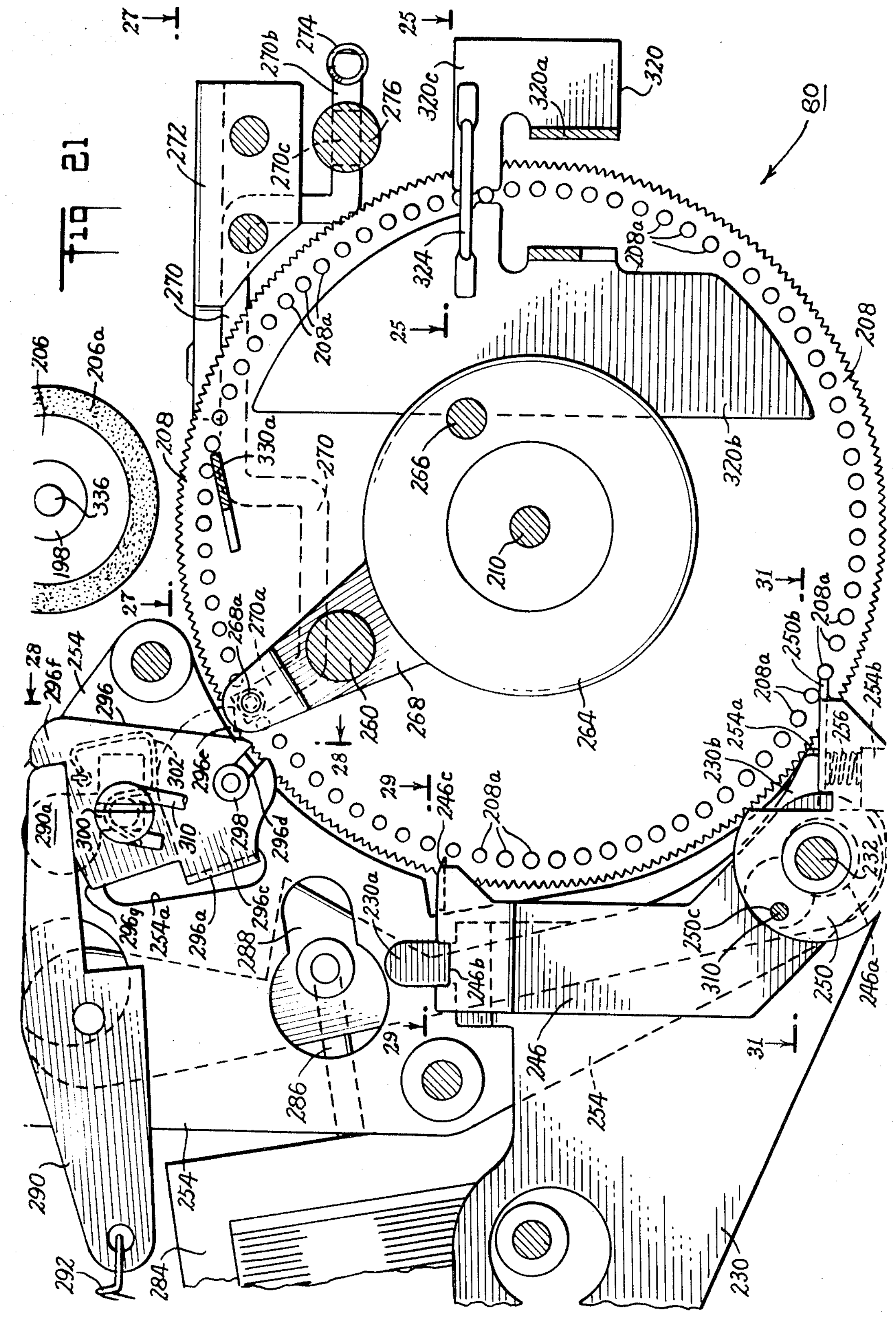
FIG. 21 is an enlargement of a portion of the assembly of FIG. 20 with the mounting plate removed.
Figure 31:
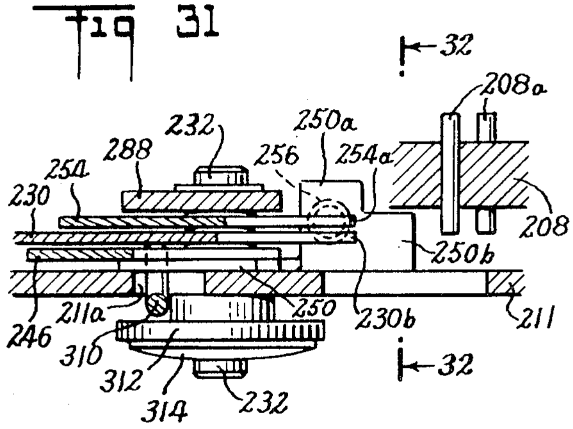
FIG. 31 is a sectional view taken along line 31—31 of FIG. 21.

Turning now to FIG. 21, a trip pawl 246 is formed with a hole 246a adjacent its lower end dimensioned for a clearance fit on pivot post 232 (FIG. 31). Thus, trip pawl 246 is carried by pivot post 232 with a limited degree of lost motion therebetween. The upper end of trip pawl 246 is bent over and an aperture **246*b* formed therein for accommodating extension therethrough of an upright finger 230*a* carried by trip lever 230** (also FIGS. 24, 29 and 30).

Figures 23, 23A:
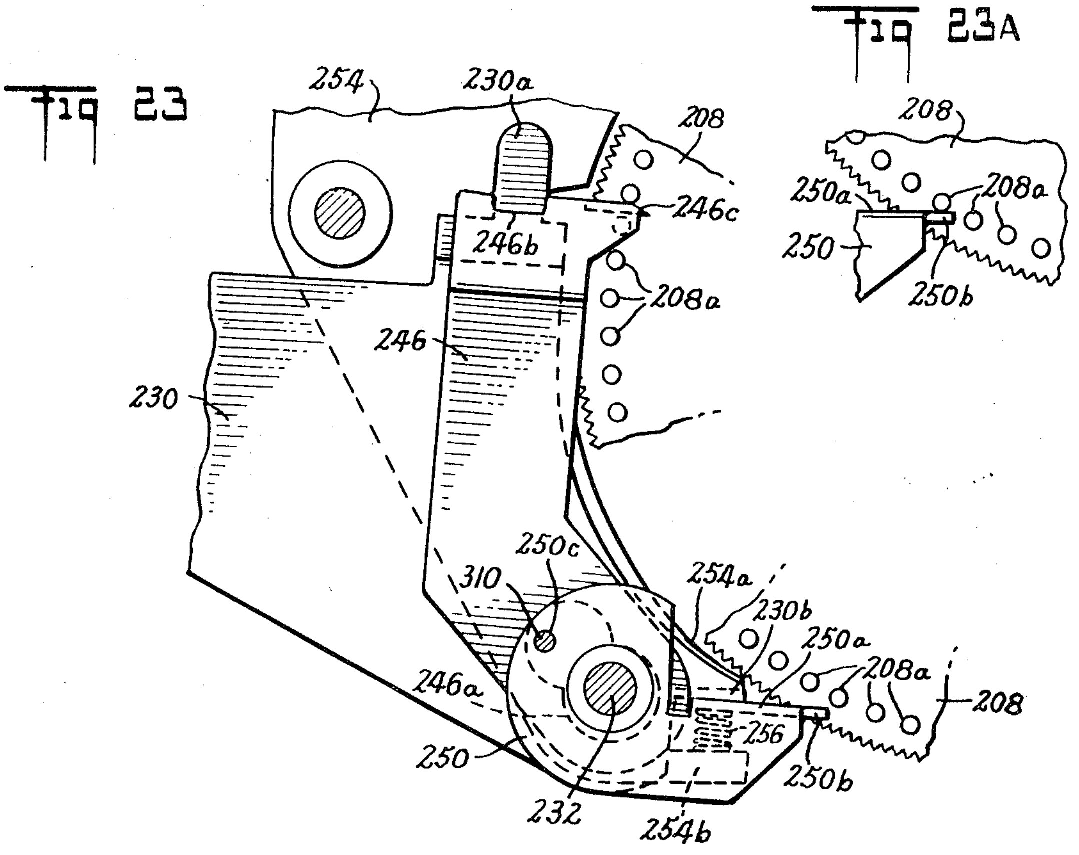
FIG. 23 is an enlarged fragmentary side elevational view of a portion of the escapement mechanism included in the tray stepping control assembly of FIG. 20.
FIG. 23A is a fragmentary view of a portion of the escapement mechanism of FIG. 23 showing the positions of various parts at one point during an escapement operating cycle.
Figures 24, 25, 26:
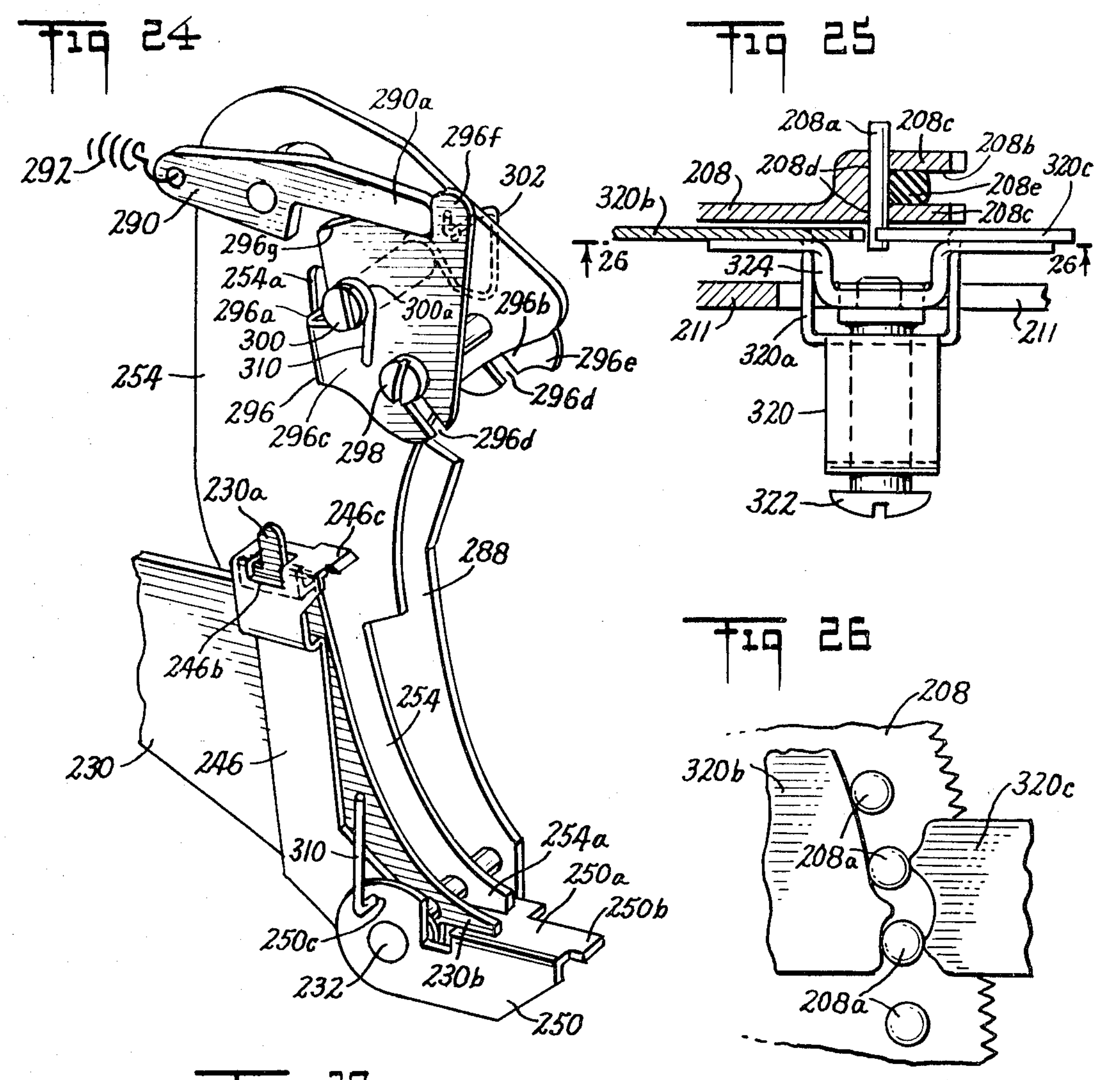
FIG. 24 is a perspective view of a portion of the tray stepping control assembly of FIG. 20.
FIG. 25 is a sectional view taken along line 25—25 of FIG. 21.
FIG. 26 is a sectional view taken along line 26—26 of FIG. 25.

As best seen in FIG. 24, the upper portion of trip pawl lever 246 is extended to the right to provide a trip pawl tip **246*c*. Trip pawl 246*c* is shaped so that it can loosely slip between adjacent pins of an annular array of axially extending pins 208*a* carried by pin wheel 208 (FIG. 23). As is seen in FIG. 25, the rim of pin wheel 208 is bifurcated to form an annular channel 208*b* defined by channel sides 208*c*. Channel sides are formed with aligned apertures 208*d* accommodating the pins 208*a* which span channel 208*b* adjacent its bottom. An elastic O-ring 208*e* is fitted in the channel 208*b* to frictionally engage the pins 208*a*. As will be seen, tab set and tab clear mechanisms are manually operated to axially shift the positions of selected pins 208*a* to set up and clear tab stops, which axial positions are preserved by O-ring 208*e***.

Figure 32:
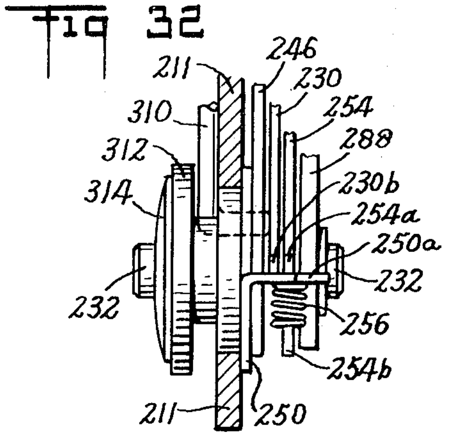
FIG. 32 is a sectional view taken along line 32—32 of FIG. 31.

Returning to FIGS. 21 and 24, a stop pawl 250 is also pivotally mounted on pivot post 232 (also FIGS. 31 and 32). The right lower portion of trip lever 230 is formed having a generally horizontally extending finger **230*b* extending in overlying relation to the bent over horizontally extending portion 250*a* of stop pawl 250. A spacing bracket 254 secured in spaced relation to mounting plate 211, has its lower end bifurcated to form an upper horizontal extension 254*a* and a lower horizontal extension 254*b* (FIGS. 31 and 32). Upper extension 254*a* overlies the horizontal portion 250*a* of stop pawl 250 while spring 256 is captured between the lower horizontal extension 254*b* and the underside of the horizontal stop pawl portion. Thus, stop pawl 250 is normally urged upwardly about pivot post 232 against the upper horizontal bracket extension 254*a*. However, when trip lever 230 is pivoted clockwise about pivot post 232, as occurs when its follower 234 rides into the cam valley 78*a* (FIG. 20), finger 230*b* tips downwardly to thereby rock the stop pawl 250 downwardly against spring 256**.

The normal positions of trip lever 230, trip pawl 245 and stop pawl 250 are as seen in FIG. 21 with the horizontally extending tip **250*d* of stop pawl 250 abutting one of the pins 208*a* of pin wheel 208, thereby resisting clockwise pin wheel rotation. Since the cam follower 234 of trip lever 230 is bearing against the periphery of the normally stationary trip cam 78 beyond valley 78*a*, trip lever 230 is held in its counterclockwise position which has the effect of maintaining the tip 246*c* of trip pawl 256 withdrawn from between consecutive pins 208*a* of pin wheel 208**.

When a data entry cycle is initiated, cam 78 is rotated one complete revolution in the counterclockwise direction by control shaft 54. As the cam follower 234 rides into the valley **278*a* at the conclusion of an entry cycle, trip lever 230 is rocked in the clockwise direction by spring 236 (FIG. 20). This has the effect of first introducing the tip 246*c* of trip pawl 246 between adjacent pins 208*a* and then depressing stop pawl 250 so that the blunt end of its tip 250*b* no longer engages a pin. The lost motion mounting of trip pawl 246 on post 232 permits limited vertical movement of the trip pawl, thus insuring that its tip 246*c* can always find its way between adjacent pins 208*a*. Also, this slight vertical movement permitted of trip pawl 246 allows a slight increment of clockwise rotation of the pinwheel 208, as seen in FIG. 21, under the force of spring 180. This fractional increment of rotation of pinwheel 208 allows the pin 208*a* previously engaged by the tip 250*b* of stop pawl 250 to escape therefrom. As the cam follower 234 rides out of the cam valley 248*a*, trip lever 230 pivots counterclockwise to its normal position. During this movement of the trip lever, the stop pawl 250 is released by finger 230*b* to pivot clockwise under the force of spring 256. The tip 250*b* of the stop pawl is biased against the underside of the pin 208*a* just escaped. At this time, the tip 246*c* of the trip lever 246 is withdrawn from between adjacent pins 208*a*, freeing the pinwheel to rotate the remainder of a full step or increment which is concluded when the blunt end of stop pawl tip 250*b* engages the next pin 208*a* counterclockwise from the pin just escaped. This concludes one increment of rotation of the pin wheel which, by virtue of the spacing between pins 208*a* which serve as detents and the gear ratios of the various gears drivingly connecting the pin wheel to the tray 26, advances the data card 111 to align the next consecutive data column at the recording station. It is seen that the parts of the tray stepping control apparatus 80 just described function as an escapement mechanism to advance the card one data column under the force of spring 180** (FIG. 2) at the conclusion of each entry cycle.

Figure 27:
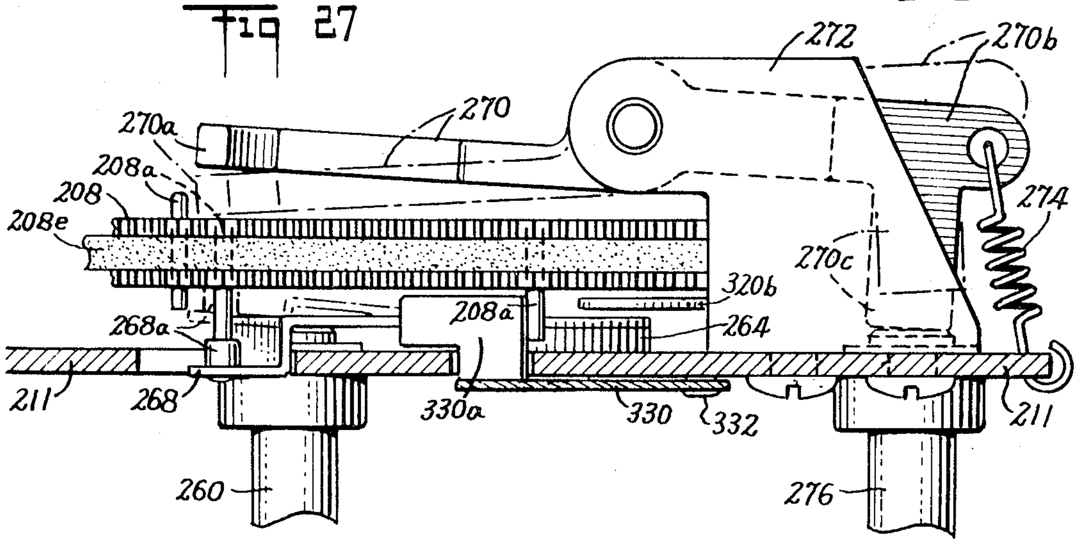
FIG. 27 is a sectional view taken along line 27—27 of FIG. 21 to illustrate the mechanism for setting and clearing tab stops.

Returning to FIGS. 21 and 27, normally the pins **208*a* of pin wheel 208 are axially positioned with their rearward ends flushed against the backside of the pin wheel rim. The only other axial position assumed by the pins 208*a* is that where their ends extend equally from each side of the pin wheel rim. Both of these pin positions are illustrated in FIG. 27. When a pin 208** extends from the backside of the pin wheel rim, the rearward extension acts as a tab stop effective to actuate a tab mechanism to be described.

To set a tab stop, a button shaft 260 is supported by the mounting plate 211 for axial movement in response to depression of a tab set key 262 projecting through an opening in the front of cover 22 as seen in FIG. 1. A ring 264, best seen in FIG. 21, is mounted on pin wheel stub shaft 210 and secured against rotation to the mounting plate 211 by a screw 266. Ring 264 carries a radially extending spring arm 268. As seen in FIG. 27, spring arm 268 is crooked so as to offset its free end from the front side of pin wheel 208. The free end of spring arm 268 carries a button **268*a* which is aligned with the pin circle for pins 208*a* carried by pin wheel 208**.

It is thus seen that when the button shaft 260 is pressed inwardly by tab set key 262, its inner end presses the central portion of spring arm 268 against the front side of pin wheel 208. At the same time, button **268*a* pushes a single pin 208*a* aligned with it axially rearwardly to extend the rearward portion of the pin beyond the rear rim of pin wheel 208. By virture of the offset in spring arm 268, the pins 208*a* cannot be pushed rearwardly beyond the point where their ends extend equally from each side of the pin wheel rim. The resiliency of spring arm 268 returns its free end and button shaft 260** to their normal solid line positions shown in FIG. 27.

At this point, it should be pointed out that the trip pawl 246 and the stop pawl 250 are effective to operate between and against the pins 208*a* of pin wheel 208 while they are in either of their two axial positions. Thus, when a pin 208*a* is shifted axially rearwardly to set up a tab stop, there is still sufficient pin extension from the front side of the pin wheel rim for the escapement pawls 246 and 250 to operate on.

Still referring to FIGS. 21 and 27, to clear a tab stop a bell crank 270 is pivotally mounted substantially at its mid-point by a bracket 272 carried by the mounting plate 211. One end 270a of bell crank 270 is positioned in alignment with the pin circle of the pins 208*a* carried by pin wheel 208. The other end 270*b* of bell crank 270 is connected to the mounting plate 211 by a spring 274 such that the bell crank is normally biased in the clockwise direction about its pivot point so that its other end 270*a* is clear of any pins whose rearward ends extend beyond the rear of pin wheel 208. A button shaft 276 carried by mounting plate 211 is pushed axially inward by a tab clear key 278 extending through an opening in the front of cover 222 (FIG. 1). The inner end of button shaft 278 engages a foot 270*c* integrally formed with bell crank 270. It is thus seen that when the button shaft 278 is shifted axially inwardly by tab clear key 278, the bell crank 270 is caused to pivot in the counterclockwise direction to press its free end 270*a* against the backside of pin wheel 208. If a pin 208*a* axially aligned with the end of 270*a* of bell crank 270 is positioned with its rearward end extending beyond the rear of pin wheel 208, depression of the tab clear key 278 causes the pin to be pushed axially forward. Its rearward end thus no longer extends beyond the rear of pin wheel 208 and can no longer act as a tab stop. When the tab clear key 278 is released, spring 274 pivots the bell crank 270 clockwise to its normal, inoperative position.

To initiate a tab function, a tab solenoid 284, carried by mounting plate 211 is energized to attract its plunger 284*a* to the right as seen in FIG. 20. An actuating pin 286 operatively couples the solenoid plunger 284*a* to a tabbing lever 288 pivotally mounted at its lower end on pivot post 232. When the solenoid plunger 284*a* is attracted to the right in response to solenoid energization, the tabbing lever 288 is rocked in the clockwise direction about pivot post 232. The upper end portion of tabbing lever 288 pivotally mounts a tab catch actuator 290 whose left end is connected to the mounting plate 211 by a return spring 292. Thus, when tab solenoid 284 is de-energized, spring 292 returns these parts to their inactive positions.

Figure 22:
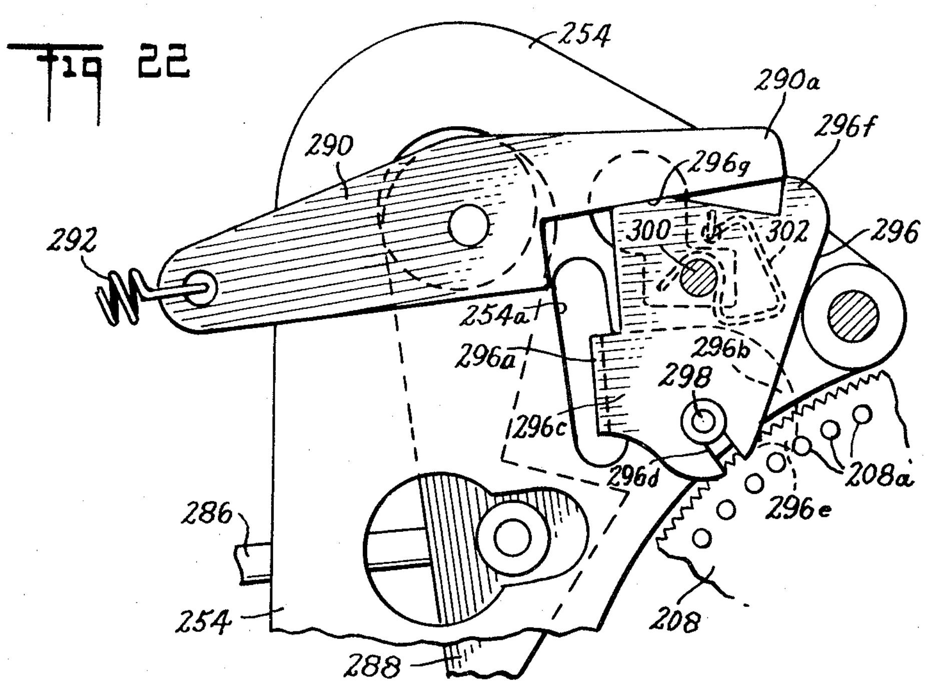
FIG. 22 is an enlarged fragmentary side elevational view of the tab mechanism portion of the assembly of FIG. 20.

As can be seen in FIGS. 21, 22 and 24, when the tab catch actuator 290 swings to the right in response to energization of the tab solenoid 284, its free right end actuates a tab catch lever 296. Tab catch lever 296 is a generally U-shaped metal stamping having legs exposed on either side of the spacing bracket 254. Thus, the body portion 296*a* of tab catch lever 296 extends through an elongated slot 254*a* in spacing bracket 254. The end of inner leg 296*b*, as well as the outer leg 296*c*, of the tab catch lever 296 are each formed having elongated slots 296*d* which receive a pivot pin 298 carried by spacing bracket 254, as best seen in FIG. 24. Pin 298 serves to mount the tab catch lever 296 normally for pivotal movement thereabout. The terminus of tab catch lever leg 296*d* is contoured so as to provide a tab catch tip 296*e* which is adapted to engage a pin 208 of pin wheel 208 positioned as a tab stop.

A pin 300 carried by leg 296*c* of tab catch lever 296 extends through an opening in spacing bracket 254 with its inner end connected to the spacing bracket by a toggle spring 302. The upper portion of tab catch lever 296 is recessed so as to provide an upstanding finger 296*f* which is engaged by the free end 290*a* of the tab catch actuator 290.

From the description thus far, it is seen that when the tab solenoid 284 is energized, the tab catch actuator 290 swings to its right and its free right end 290*a*, upon engaging finger 296*f*, rocks the tab catch lever 296 in the clockwise direction about its pivot pin 298. As seen in FIG. 22, the upper edge of tab catch lever 296 is contoured so as to provide a camming edge 296*g* which is effective to rock the tab catch actuator 290 in the counterclockwise direction about its pivot point such that the free end 290*a* thereof is forced to ride over the top of finger 296*f*. Thus, after the tab catch lever has been rocked clockwise by tab catch actuator 290 to a stable actuated position preserved by toggle spring 302, the free end 290*a* of the tab catch actuator overrides the finger 296*f*. As will be seen, by virtue of this design the tab catch lever 296 can respond to a tab stop without requiring that the tab catch actuator 290 be returned to its inactive position by return spring 292.

By comparing FIGS. 21 and 22, it is seen that when the tab catch lever 296 is in its inoperative, counterclockwise position (FIG. 21) sustained by toggle spring 302, tab catch tip 296*e* is clear of any tab stop pins 208*a* projecting from the rear of pin wheel 208. On the other hand, when the tab catch lever 296 is rocked clockwise to its stable operative position by tab catch actuator 290, the tab catch tip 296*e* is positioned in intercepting relationship with any tab stop pins extending beyond the rear of pin wheel 208.

Figure 28:
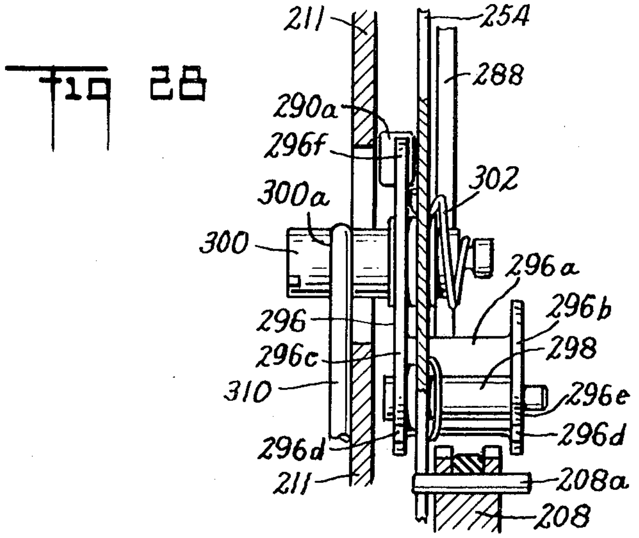
FIG. 28 is a sectional view taken along line 28—28 of FIG. 21.
Figure 29:
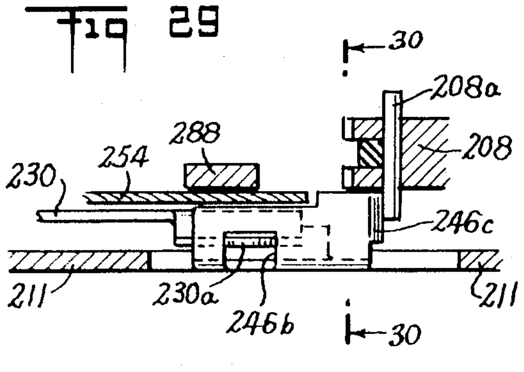
FIG. 29 is a sectional view taken along line 29—29 of FIG. 21.
Figure 30:
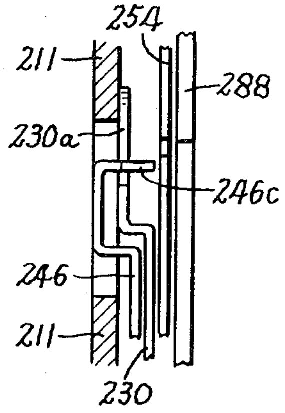
FIG. 30 is a sectional view taken along line 30—30 of FIG. 29.

Having initiated a tabbing function, it remains to free the pin wheel of escapement pawls 246 and 250 so that it can rotate, thus allowing the tray 26 to be moved in the card advance direction by spring 180 (FIG. 2). As best seen in FIG. 24, the tab catch lever 296 is linked to the stop pawl 250 by a link 310 whose upper end is hooked around pin 300 and whose lower end is hooked to the stop pawl 250. As seen in FIG. 28, the upper end of link 310 is preferably hooked in an eccentric groove 300*a* formed in pin 300 such that by selectively rotating pin 300, the effective length of the link 310 can be adjusted.

As seen in FIG. 31, the lower end of link 310 is hooked so as to extend through an opening 211*a* in mounting plate 211 where it is caught in a hole 250*c* in stop pawl 250 located to the left of the stop pawl pivot post 232. The lower end of link 310 is retained in place by a flange 312 held on the outer end of pivot post 332 by a clip 314.

From the description thus far, it is seen that when the tab catch lever 296 is rocked to its clockwise stable actuating position by tab catch actuator 290, link 310 is pulled slightly upwardly which is effective to rock the stop pawl 250 clockwise, thereby disengaging stop pawl tip 250*b* from abutting engagement with pin 208*a*. This frees the pin wheel for rotation, which in turn frees the tray 26 for card advance movement. As the pin wheel 208 rotates in a clockwise direction, seen in FIGS. 21 and 22, a tab stop pin ultimately moves around to the point where it engages the tab catch tip 296*e*, thereby tripping the tab catch lever 296. The tab catch lever rocks in the counterclockwise direction about its pivot pin 298 to its stable inoperative position, thereby releasing the stop pawl 250 via interconnecting link 310 such that the stop pawl tip **250*b* moves upwardly in response to spring 256 into abutting engagement with a pin wheel 208*a*. This terminates the tab movement of the tray 26 wherein the card 111** is shifted directly to a specified data column entry position without stopping at intermediate data columns. It will be appreciated that when only selected data columns in the card are to receive data entries, this tabbing function can be employed to materially decrease the time required to complete the data character entries.

The previously mentioned configuration of the tab catch lever 296 which causes the tab catch actuator 290 to ride over the tip of finger **296*f* after the lever has assumed its actuating position enables the catch lever to respond to closely spaced and even consecutive tab stops. This is due to the fact that the free end 290*a* of the tab catch actuator 290 does not engage the vertical edge of the finger 296*f* and thus the tab catch lever 296 can respond to a tab stop before the tab catch actuator 290 is returned to its inactive position by return spring 292**.

The pivotal mounting of the tab catch lever 296 utilizing slot **296*d* to engage tab catch lever pivot pin 298 enables the tab catch lever to be cammed out of the way by a tab stop should a tab function be inadvertantly initiated during the execution of a tray return function, wherein the pin wheel is being rotated by roller 296 in the counterclockwise direction. It is seen that by this construction, possible damage to the pins 208*a* and the tab catch lever 296** is avoided.

It should also be noted that the tab catch lever 296 does not absorb the kinetic energy required to stop pin wheel rotation at a particular tab setting. Instead, the pin wheel is halted at a desired tab position by the stop pawl 250 which rocks upwardly to abut a pin wheel pin **208*a* after the tab catch lever 296 has been rocked to its inoperative position. It should also be noted that the contour of the tip 296*e* of tab catch lever 296 is tapered such that it can be immediately returned to its operative position since it readily clears the previous tab stop. Thus, the tab stop lever 296** could be tripped by the very next pin if it were shifted to a tab stop position.

If a tab stop is spaced a considerable distance or even a moderate distance from the last stationary position of tray 26, the pin wheel could reach such a velocity that it would cause damage to various parts in bringing it to a halt. To limit the angular velocity of pin wheel 208 during a tabbing function, a governor 320 seen in FIGS. 20, 21, 25 and 26 is provided. Basically, governor 320 is a sheet metal stamping formed having a central offset bracket portion **320*a* by which the governor is pivotally mounted to the mounting plate 211 by a screw 322. The governor 320 has a pair of wings 320*b* and 320*c*, with wing 320*b* enlarged so as to present an increased governor mass. The inner edges of wings 320*b* and 320*c* of governor 320 are in closely spaced relation and have carefully contoured projections, two from wing 320*c* and one from wing 320*b* positioned in interleaved fashion. The governor 320 is positioned such that the pin wheel pins 208*a* pass between the governor wings 320*b* and 320*c*. By virtue of these projections, which are best seen in FIG. 26, the gap between the governor wings forms, in effect, a serpentine path for the pin wheel pins. As each pin 208*a* passes through this path, it engages these projections to impart oscillatory motion to the governor 320. As the velocity of the pin wheel 208 increases, the velocity of oscillation of the governor 320 is altered, thus abstracting kinetic energy therefrom. The pin wheel thus rapidly reaches a terminal velocity which is substantially less that it would be without governor 320. As seen in FIG. 21, a strap 324 interconnecting governor wings 320*b* and 320*c*** serves to preserve the dimension of the gap therebetween during operation.

Still concerning the tabbing function, there is a possibility that pin wheel 208, upon being stopped by stop pawl 250 at the conclusion of a tab shift step, may bounce in the opposite direction by a sufficient amount such that the stop pawl will ratchet pass the next pin the clockwise direction before finally halting the pin wheel. If this should happen, it is seen that the data card is stopped one data column in advance of the data column where the tab stop was set. If this situation is not recognized, an erroneous data entry will ensue. To prevent this backward bounce of pin wheel 208 and tray 26 coupled thereto, an anti-bounce pawl 330, seen in FIG. 20, is pivotally mounted on a pivot pin 332 carried by mounting plate 211. The anti-bounce pawl 330 has a generally horizontally extending tip **330*a* which projects through an opening 211*c* in the mounting plate 211. This tip 330*a*, seen in FIG. 21, is positioned to engage the pins 208*a* and resist counterclockwise rotation of the pin wheel. Returning to FIG. 20, a spring 334 interconnected between anti-bounce pawl 330 and the mounting plate 211 normally urges the anti-bounce pawl in the clockwise direction so that the pawl tip 330*a* is held in abutting relation with the pins 208*a* should the pin wheel 208 attempt to rotate in the counterclockwise direction. However, when the pin wheel is rotated in the clockwise direction by spring 180 (FIG. 2), spring 334 yields and the anti-bounce pawl tip 330*a*, due to its slanted orientation, allows the pins 208*a*** to ratchet by.

When it is desired to execute a tray return function, it is necessary to depress or rock the anti-bounce cam 330 counterclockwise so that its tip **330*a* cannot impede counterclockwise rotation of the pin wheel imparted to it by peripheral engagement with roller 206 of the tray return subassembly 76. To achieve this, a laterally extending pin 336 is secured to the end of stub shaft 198 journalling the roller 206 of the tray return subassembly 76. When tray return lever 200 is rocked downwardly by solenoid 202 (FIG. 16) to swing the roller 206 downward into peripheral engagement with the pin wheel 208, pin 336 engages the upper edge of anti-bounce pawl 330, thereby ducking the anti-bounce pawl tip 330*a* out of engagement with the pins 208*a*. It will also be noted that stop pawl 250 also enables the pins 208**a to ratchet by when the pin wheel is rotated counterclockwise during tray return.

PRINTER ATTACHMENT

As will now be described, in addition to entering data on the card in the form of punched holes, the recorder of the present invention is adapted to print out on the card the data characters corresponding to those punched into the card. This renders a card prepared by the instant recorder readily humanly readable as well as machine readable. To effect the imprinting of data characters corresponding to those punched into the card, the recorder is adapted with a printer attachment generally indicated at 81 in FIGS. 2 and 3 and seen in greater detail in FIGS. 33 through 39.

Figures 33, 34:
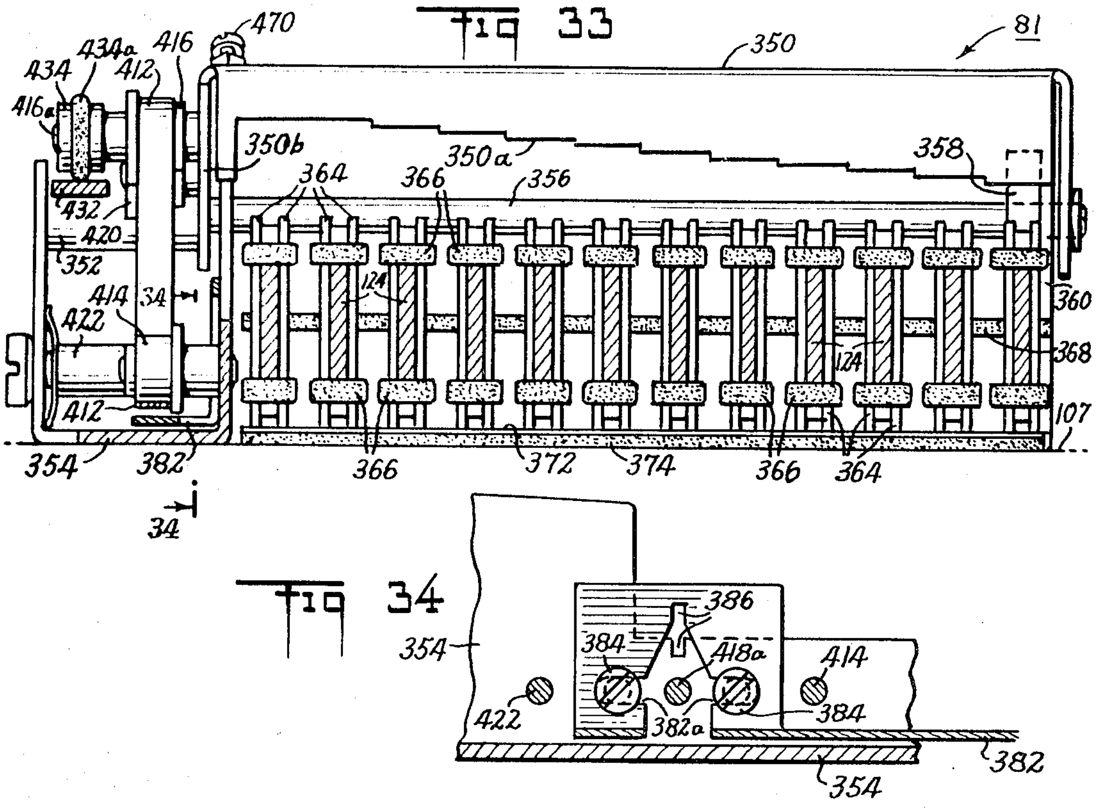
FIG. 33 is a sectional view taken along line 33—33 of FIG. 3 to show a portion of the printer attachment.
FIG. 34 is a sectional view taken along line 34—34 of FIG. 33.
Figure 35:
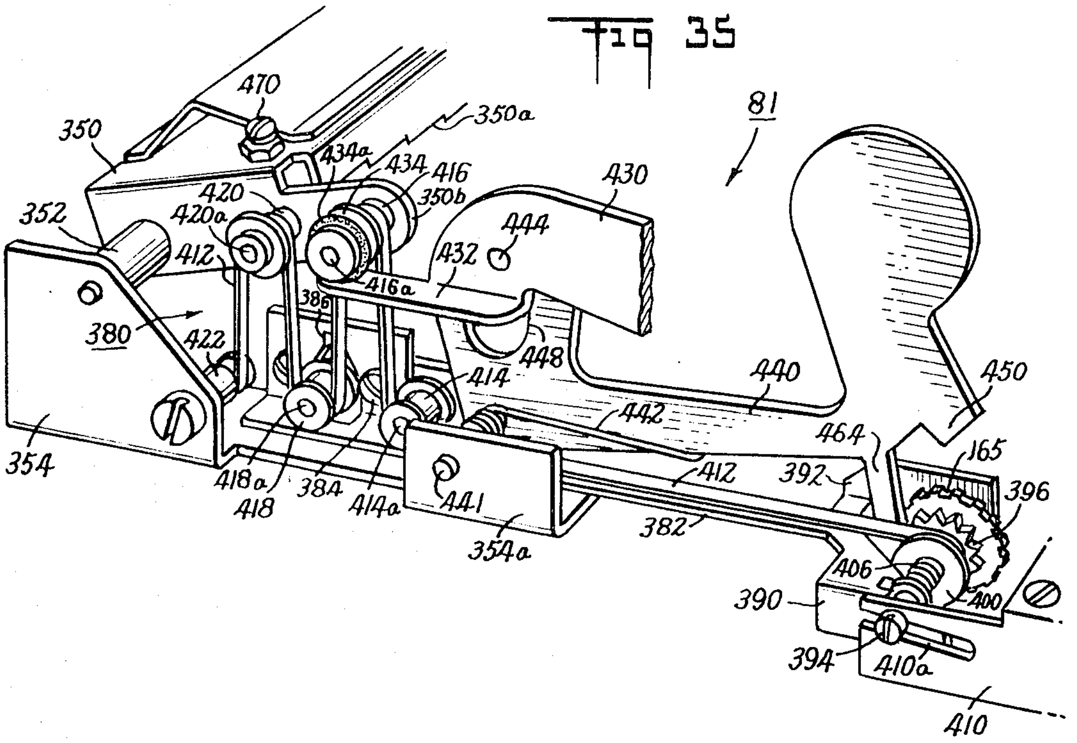
FIG. 35 is a perspective view of the printer attachment of FIG. 3.

The printer attachment 81 includes a laterally elongated step cam 350 having a downwardly turned edge 350a formed with a series of cam surfaces arranged in staircase fashion (FIGS. 3 and 33). The left end of step cam 350, as seen in FIGS. 33 and 35, is pivotally mounted by a pin 352 supported at its ends in the upright legs of a U-shaped bracket 354. The other, right end of step cam 350 is pivotally mounted by a pin 356 carried in an eccentric 358 in turn rotatably mounted by a bracket 360 (FIG. 3). Eccentric 358 is secured to an adjustment lever 362, which is manipulated to effect a limited adjustment of the elevational position of pin 356. This, in turn, adjusts the elevation of the right end of step cam 350 relative to its left end. This is an initial adjustment which is effected to achieve precise print selection angular orientation of the print wheel 165 by the step cam 350, as will be seen.

As best seen in FIGS. 3 and 33, the right end of each plunger 124 of solenoids 120 has secured thereto a pair of generally H-shaped print interposers 364. Preferably, the print interposers 364 are secured to the solenoid plungers 124 by elastic bands 366 which embrace left upper and lower extensions of the interposers and plunger and act to clamp the right end of the solenoid plunger between the pair of print interposers. Thus, the print interposers are flexibly connected to the various solenoid plungers 124 and move to the left to actuated positions, as seen in FIG. 3, with the plungers as their associated solenoids 120 are energized.

The right end of each print interposer 364 is formed having upwardly extending projections 364a and downwardly extending projections 364b, as best seen in FIG. 3. Intermediate these projections, the interposers are formed with a longitudinally extending slot 364c accommodating a laterally elongated bumper 368 of resilient material mounted by upright posts 370. The bumper 368 acts as a stop against which the solenoid plungers 124 abut as they are returned by their respective springs 128. This bumper absorbs the impact of the returning solenoid plungers and materially reduced the operating noise of the recorder.

The punch interposers 360 are supported by their associated solenoid plungers 124 with their downward projections 364b in closely spaced relationship to the upper, smooth surface of a metal sheet 372 overlying a slab of resilient material 374, both secured to top plate 107.

Still referring to FIG. 3, step cam 350 is normally held upwardly to maintain its step cam edge 350a in an elevated, out-of-the-way position by a spring 376. In a manner to be described, step cam 350 is rotated in the counterclockwise direction during a data character entry cycle of the recorder. It is seen from FIG. 3 that when one of the solenoids 120 is energized to select a particular one of the punches 106, the print interposer pair coupled to the actuated plunger 124 is shifted to the left such that its projections 364a and 364b are aligned under the discending step cam edge 350a. The step cam edge 350a engages the upper print interposer projections 364a, flexing the actuated interposer pair downwardly to press their lower projections 350b against sheet 372 which serves as a reference plane. The underlying slab 374 deadens the noise of this operation. At this point, the step cam counterclockwise rotation is halted. From FIG. 33, it is seen that by virtue of the step cam edges' uniform stair step configurations, the increment of counterclockwise rotation permitted by the step cam during each entry cycle depends upon which of the solenoids 120 was energized.

Specifically, it is seen that if one of the solenoids 120 at the right of the solenoid bank is energized, one of the more shallow step cam edges will encounter the actuated print interposer pair. The permitted increment of step cam rotation is therefore relatively small. On the other hand, if one of the solenoids at the left end of the solenoid bank is acutated, the permissible increment of counterclockwise rotation of the step cam is proportionately larger since the effected step cam edge is proportionately deeper. Preferably, the upper and lower edges of the print interposer projections 364a and 364b lie on a common diamater such that even if they are slightly tilted when the interposer pair is encountered by the step cam edge 350a, it will still establish the same increment of set cam rotation.

Turning to FIG. 35, the increment of counterclockwise rotation of the step cam 350 during each entry cycle is, in effect, translated by a block and fall mechanism, generally indicated at 380, into a proportional increment of rotation of print wheel 165. The print wheel is formed having a series of raised type characters uniformly distributed around its periphery; the type characters corresponding to those data characters which are entered from the keyboard 32 and into the card 111 by the punches 106. Print wheel 165 is carried by a resilient spring arm 382 adjustably mounted at its other end to an extension of the bracket 354. As seen in FIG. 34, the mounted end of spring arm 382 is clamped to bracket 354 by screws 384 operating in slots 382a. A screw-driver tip engaging opposed notches 386 in the spring arm 382 and bracket 354 can be conveniently employed to effect precise final adjustment of the longitudinal position of print wheel 165 before mounting screws 384 are tightened down.

Figure 37:
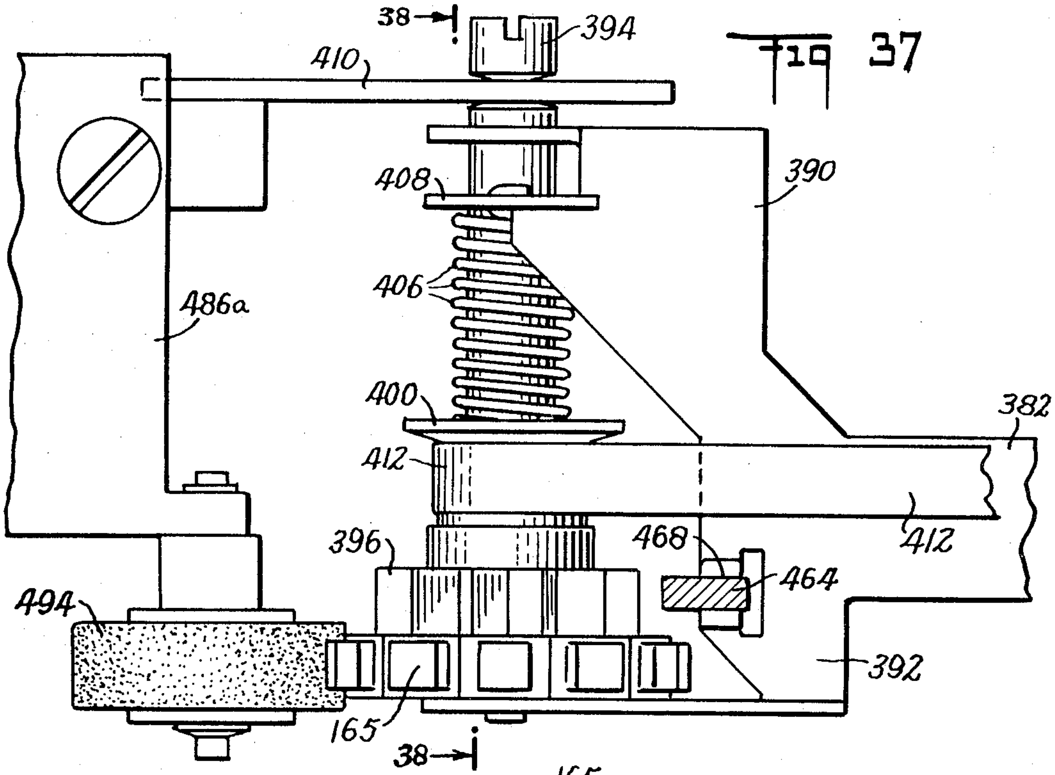
FIG. 37 is a sectional view taken along line 37—37 of FIG. 36.
Figures 38, 39:
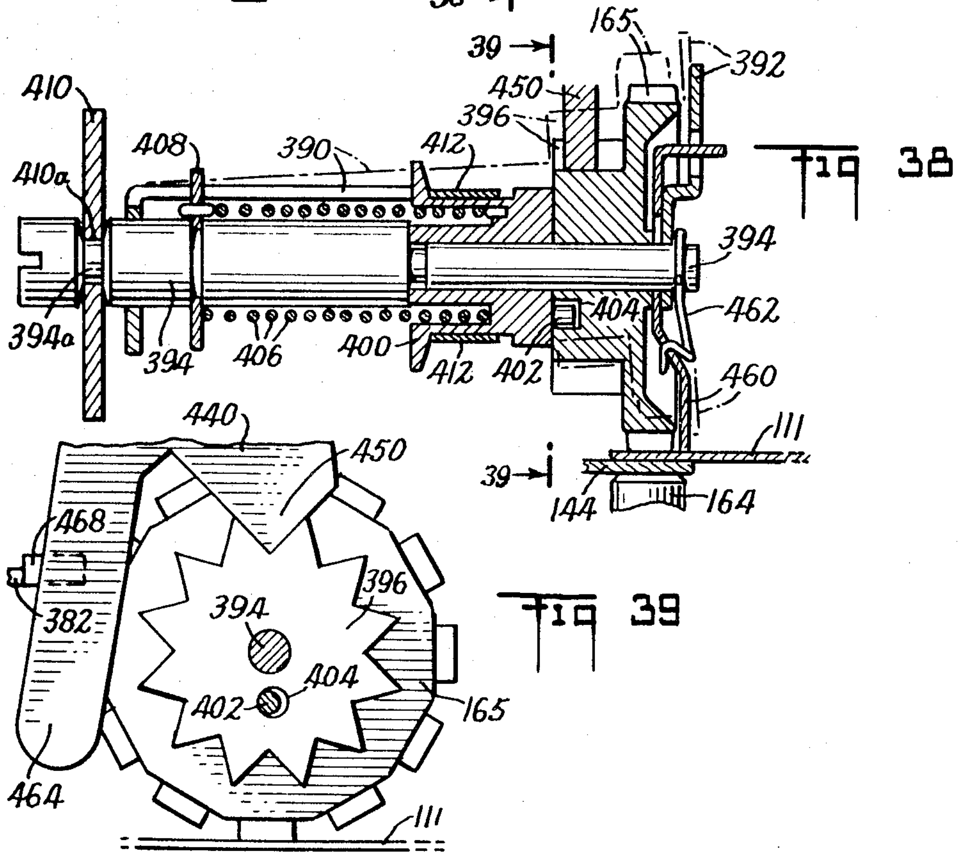
FIG. 38 is a sectional view taken along line 38—38 of FIG. 37 to illustrate the pivotal mounting of the print wheel included in the printer attachment.
FIG. 39 is a sectional view taken along line 39—39 of FIG. 38.

The free end of spring arm 382, as best seen in FIGS. 37 and 38, is bifurcated to provide spaced brackets 390 and 392 which serve to mount the ends of a shaft 394. Shaft 394 journals the print wheel 165, which is integrally formed with a detent gear 396. A reel 400 also journalled on shaft 394 is coupled to the print wheel 165 by a limited, lost motion connection consisting of a pin 402 received in a clearance hole 404, as seen in FIG. 38. A torsion spring 406 also carried by shaft 394 is anchored at one end to a clip 408 secured on the shaft and at the other end to reel 400, such that the reel, as well as the print wheel 165, is continuously urged into clockwise rotation, as seen in FIG. 35.

Still referring to FIG. 38, the left end of shaft 394 is formed with a chamferred annular groove 394a which is received in a sloping slot 410a formed in an adjustably positioned bracket 410 (FIG. 35). The print wheel 165 is thus mounted for pivotal movement against the resiliency of its spring arm 282. The height of the print wheel pivot point is adjusted by movement of bracket 410.

Reel 400, which is part of the block and fall mechanism 380, acts as a takeup reel for a ribbon 412 which is wrapped around a roller 414 journalled on a pin 414a carried by fixed bracket 354. Ribbon 412 continues upwardly as seen in FIG. 35, and is wrapped on a second roller 416 journalled on a pin 416a carried by an extension 350b of step cam 350. Ribbon 412 is then wrapped around a lower roller 418 journalled on a pin 418*a* carried by bracket 354 and continues upwardly around a second upper roller 420 journalled on a pin 420*a* carried by step cam projection 350*b*. Finally, the end of ribbon 412 is anchored to a post 422 threaded through a hole in bracket 354. Post 422 may be adjustably rotated to take up any slack in ribbon 412, as well as to adjustably orient the print wheel 165 to the appropriate reference orientation when the various parts of the printer attachment 81 are in the in-operative position shown in FIGS. 35 and 36.

Returning to FIG. 2, the oscillating actuator 88 carries an elongated print actuator arm 430 (also FIG. 35). The free end of print actuator arm 430, as best seen in FIG. 35, is formed having a finger 432 which extends into underlying relationship with a roller 434 carried by pin 416*a* with roller 416. Roller 434 is fitted with a noise deadening O-ring 434*a* which is engaged from below by finger 432 of the print actuator arm 430. When the print actuator arm 430 is in the position shown in FIG. 35, which is the position it assumes in the intervals between entry cycles. It is seen that the finger 432 maintains the step cam 350 in the elevated position shown in FIGS. 3, 35 and 36. As the actuator 88 rocks downwardly to begin an entry cycle, the fingered end of print actuator arm 430 also moves downwardly, releasing the step cam 350 which carries the roller 434. Takeup reel 400, under the force of spring 406 begins winding up the ribbon 412. The rotation of takeup reel 400 rotates print wheel 165. As the ribbon 412 is wound on the takeup reel 400, the step cam 350 is forced to rock downwardly, following the downward movement of the print actuator arm 430.

When one of the step cam edges 350*a* encounters an actuated print interposer pair 364 (FIG. 3), this terminates the rotation of the step cam 350 and also, via the interconnecting ribbon 412, the rotation of the print wheel 165. The print actuator arm 430 will continue downwardly for the remainder of the first half of an entry cycle, but the step cam 350 cannot follow because of the acutated print interposer pair 364. It is thus seen that the various print interposers 364, when actuated, establish different increments of rotation of the step cam 350 and, by the same token, print wheel 165. The interconnecting block and fall mechanism 380 serves as an amplifying or magnifying network for increasing the step differential between the series of cam steps as it effects the orientation of the print wheel. Thus, the print wheel 165 can be readily oriented through 360° to the various print positions around its periphery under the control of the step cam 350 which need rotate through only a small angle.

Having angularly oriented the print wheel 165 under the control of step cam 350 to the approximate orientation required to imprint the appropriate data character on the card 111 positioned therebelow, it remains to finally angularly position the print wheel 165 and also to impart a hammer blow thereto so as to impact the appropriate data character against the data card.

Figure 36:
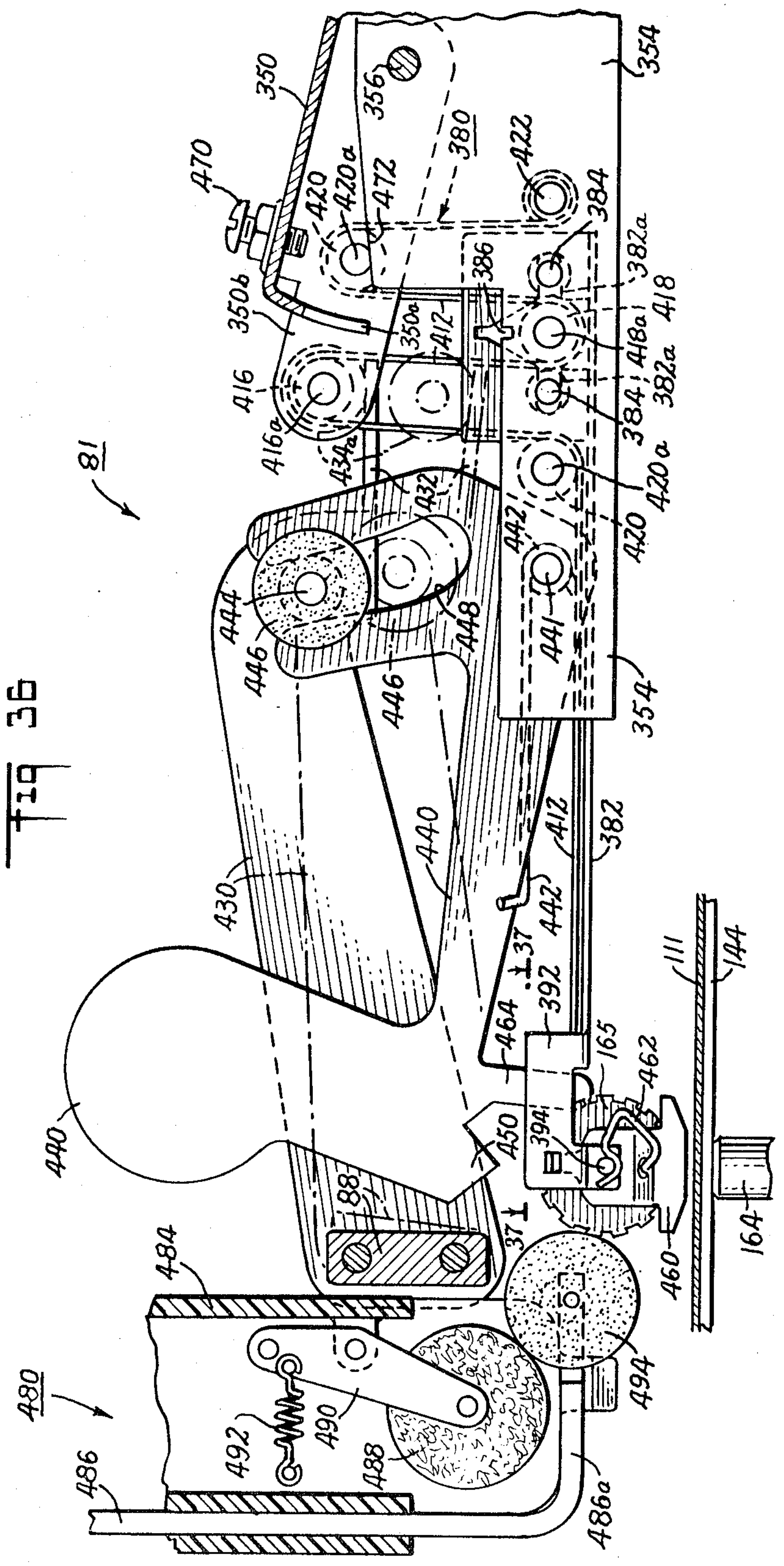
FIG. 36 is an enlarged sectional view of the printer attachment taken along line 36—36 of FIG. 2.

As seen in FIGS. 35 and 36, a print hammer 440 is pivotally mounted by a pin 441 supported between spaced flanges 354*a* of bracket 354. A spring 442 normally urges the hammer 440 upwardly and out of interferring relation with the print wheel 165. The print actuator arm 430, as best seen in FIG. 36, carries a stub shaft 444 which, in turn, journals a flanged cam follower roller 446. Roller 446 operates in a recessed cam track slot 448 formed in hammer 440 above its pivot shaft 441.

Still referring to FIG. 36, as the print actuator arm 430 rocks downwardly, in response to rotation of box cam 64 (FIG. 3), the follower roller 446 descends in the cam track 448 in hammer 440, bearing against the left edge thereof. The hammer 440 is depressed gradually bringing a V-shaped tooth 450 into one of the detends formed in the detent gear tooth 396 (FIG. 39). This effects final angular orientation of the print wheel 165, permitted by the lost motion connection between the print wheel and takeup reel 400, so that the appropriate data character type on the print wheel periphery is positioned directly over the card 111 on which it is to print. As the follower roller 446 approaches the lower portion of cam track 448, the slope of the left edge decreased abruptly so as to drastically increase the velocity of downward movement of hammer 440 in response to downward movement of the print actuator arm 430. This increase in hammer velocity is communicated at the print wheel 165 by way of tooth 450 and detent gear 396 to impact the character type on print wheel 165 against card 111. It is seen from FIG. 38 that the print wheel is swung downward in an arc about the pivotal connection of its shaft 394 to bracket 410.

While hammer 440 is depressing print wheel 165, a pressor foot 460 loosely carried by shaft 394, as seen in FIG. 38, and sprung downwardly by spring 462 removes any curl in the data card 111 adjacent the location of imprinting aligned above supporting post 164 prior to imprinting. A tongue 464 (FIGS. 36 and 37) depending from hammer 440 rides in a notch 468 formed in spring arm 382 to insure hammer alignment with detent gear 396.

When the print actuator arm 430 reaches the lower limit of its downward movement and begins its upward return movement, follower roller 446 engages the lower right edge of cam track 448 to lift the hammer 440. The print wheel 165 is lifted from printing contact with the data card 111 by its mounting spring arm 382, thus completing the printing of a data character typically at the top of the card column in which the same character was punched.

Returning to FIG. 36, a screw 470 is adjustably threaded through the top surface of step cam 350 such that its tip is adjustably positioned above the upper edge 472 of the inner upright portion of bracket 354. Screw 470 establishes the maximum increment of rotation of step cam 350 in the absence of energization of any of the solenoids 120 (FIG. 3), such as occurs when a space key included in the keyboard is depressed. When this occurs, the step cam orients the print wheel to print a suitable character, such as a dot, on the card over the data column which was skipped. Since no one solenoid 120 is energized, no character is punched into the skipped data column.

To apply ink to the print wheel 165, an ink cartridge, generally indicated at 480 in FIG. 36, is removably inserted into the recorder through an opening 482 in cover 22 (FIG. 1). Basically the ink cartridge 480 consists of an elongated, generally rectangular molded plastic case 484 which is inserted into the recorder along a path established by a fixed guide member 486. The ink cartridge 480 further includes an ink impregnated inking roller 488 rotatably mounted at one end of a bell crank 490, which in turn is pivotally mounted intermediate its ends to a sidewall of the case 484. A spring 492 is connected at one end to the upper end of the bell crank 490 and anchored at its other end to the opposite sidewall of case 484. It is thus seen that the bell crank is urged to rotate about its pivotal mounting point in the counterclockwise direction by spring 492. An ink transfer roller 494 is rotatably mounted to a bracket portion 486a of guide member 486 in a position such that when the cartridge 480 is inserted in place, the periphery of inking roller 488 bears against the periphery of the ink transfer roller 494 under the urgency of spring 492. The periphery of ink transfer roller 494 in turn bears against the periphery of the print wheel 165 while it assumes its raised position under the influence of spring arm 382.

Thus, when the print wheel 165 is rotated by spring 406 during an entry cycle, it imparts rotation to the ink transfer roller 494 and thence to inking roller 488. As a consequence, ink is transferred from the inking roller to the raised type characters on the print wheel. It will be noted that the print wheel bears against the transfer roller during the greater part of an entry cycle; the interval during which the print wheel is depressed by the hammer 440 being only a frictional part of an entry cycle duration.

As is seen in FIG. 33, there is considerable vertical spacing between the lowermost or most shallow step cam edge 350*a* and the first print interposer pair 364 at the right of the row of interposers. This provides considerable overrun of the print wheel 165 incidental to the print selection process, thus resulting in the application of fresh ink to most of the character types on the print wheel during each entry cycle.

When the inking roller 448 goes dry, the cartridge 480 is replaced with another cartridge to, in effect,replenishing the ink supply for the printer attachment 81.

It is seen that the printer attachment is a true attachment in the sense that it can be removed without impairing the ability of the recorder to operate as a key punch.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A data recorder comprising, in combination:

A. a keyboard for entering data characters;

B. a holder for a data card receiving the data characters entered by said keyboard;

C. a plurality of solenoids individually actuated from said keyboard;

D. a control shaft adapted to execute a complete revolution in response to each data character entry cycle initiated from said keyboard;

E. a control cam secured on said control shaft;

F. a punch actuator mounted to execute a complete cycle of oscillation during each data character entry cycle under the control of said control cam;

G. a plurality of punches individually mounted for reciprocating movement to effect discrete data character perforations in the data card;

H. a plurality of punch interposers each formed having an elongated vertical slot;

I. a separate actuator pin operatively connected at one end to each said solenoid and engaged at its other end in said slot in a different one of said interposers;

J. an interposer guide pin slidingly mounting each said interposer for horizontal movement to an actuated position by the associated one of said actuator pins in response to energization of the associated one of said solenoids; each said guide pin fixedly secured at one end to a different one of said punches; and K. a member common to all of said punches and operatively coupled to said punch actuator to be reciprocated thereby, said member 1. engaging an actuated one of said punch interposers upon downward movement to depress the one of said punches secured to the guide pin mounting said actuated interposer into perforating engagement with said data card during the first half of an entry cycle as said actuated interposer reciprocates downwardly relative to its associated actuating pin, and
2. operatively engaging said depressed punch during upward movement to lift it out of perforating engagement with said data card during the second half of an entry cycle.

2. The data recorder defined in claim 1, which further includes

A. a spring operating to return each said punch interposer and actuator pin from their actuated positions upon de-energization of said solenoids.

3. The data recorder defined in claim 1, wherein said common member is formed having a window accommodating extension of each said guide pin therethrough, 1. the upper edge of said window being spaced from each said guide pin such that said member normally does not operatively engage said guide pins during reciprocation,
2. each said interposer having means entering into the space between said window upper edge and each said guide pin when moved to said actuated position to transmit the downward movement of said member to guide pins to depress said punches,
3. the lower edge of said window engaging each said guide pin to lift the depressed ones of said punches during upward movement of said member.

* * * * *